(12) United States Patent
Barajas Hernandez et al.

(10) Patent No.: US 9,830,706 B2
(45) Date of Patent: Nov. 28, 2017

(54) GENERATING GEOREFERENCE INFORMATION FOR AERIAL IMAGES

(71) Applicant: Skycatch, Inc., San Francisco, CA (US)

(72) Inventors: Manlio Francisco Barajas Hernandez, Jalisco (MX); Leonardo Felipe Romo Morales, Jalisco (MX); David Chen, San Francisco, CA (US); Sida Li, Urbana, IL (US)

(73) Assignee: SKYCATCH, INC., San Francisco, CA (US)

( * ) Notice: Subject to any disclaimer, the term of this patent is extended or adjusted under 35 U.S.C. 154(b) by 0 days.

(21) Appl. No.: 14/857,238

(22) Filed: Sep. 17, 2015

(65) Prior Publication Data

US 2017/0084037 A1    Mar. 23, 2017

(51) Int. Cl.
| | | |
|---|---|---|
| *G06K 9/00* | (2006.01) | |
| *G06T 7/00* | (2017.01) | |
| *G06K 9/46* | (2006.01) | |
| *G06T 17/05* | (2011.01) | |
| *G01C 21/26* | (2006.01) | |

(52) U.S. Cl.
CPC ............ *G06T 7/0044* (2013.01); *G01C 21/26* (2013.01); *G06K 9/0063* (2013.01); *G06K 9/4609* (2013.01); *G06K 9/4671* (2013.01); *G06T 17/05* (2013.01); *G06T 2207/10028* (2013.01); *G06T 2207/10032* (2013.01);
(Continued)

(58) Field of Classification Search
None
See application file for complete search history.

(56) References Cited

U.S. PATENT DOCUMENTS 6,757,445 B1 *  6/2004  Knopp ................... G01C 11/06
                                              382/154
8,743,115 B1    6/2014  Mallet et al.
(Continued)

FOREIGN PATENT DOCUMENTS

WO    WO 2017-048301 A1    3/2017

OTHER PUBLICATIONS

International Search Report & Written Opinion issued in PCT/US2015/054731 dated Jul. 11, 2016.

*Primary Examiner* — Fred Hu
(74) *Attorney, Agent, or Firm* — Keller Jolley Preece

(57) ABSTRACT

Systems and methods are disclosed for generating georeference information with respect to aerial images. In particular, in one or more embodiments, systems and methods generate georeference information relating to aerial images captured without ground control points based on existing aerial images. For example, systems and methods can access a new set of aerial images without ground control points and utilize existing aerial images containing ground control points to generate a georeferenced representation corresponding to the features of the new set of aerial images. Similarly, systems and methods can access a new image without ground control points and utilize an existing georeferenced orthomap to produce a georeferenced orthomap corresponding to the features of the new image. One or more embodiments of the disclosed systems and methods permit users to obtain georeference information related to new images without the need to place ground control points or collect additional georeference information.

20 Claims, 14 Drawing Sheets

(52) U.S. Cl.
CPC ............... *G06T 2207/20024* (2013.01); *G06T 2207/20076* (2013.01); *G06T 2207/30181* (2013.01)

(56) References Cited

U.S. PATENT DOCUMENTS

| | | |
|---|---|---|
| 2002/0085095 A1 | 7/2002 | Janssen |
| 2008/0228335 A1 | 9/2008 | Bodin et al. |
| 2010/0092045 A1 | 4/2010 | Zimmer et al. |
| 2013/0195363 A1 | 8/2013 | Janky et al. |
| 2014/0147014 A1* | 5/2014 | Mallet ................... G06T 7/2086 382/107 |
| 2015/0371431 A1* | 12/2015 | Korb ......................... G06T 9/00 382/113 |

* cited by examiner

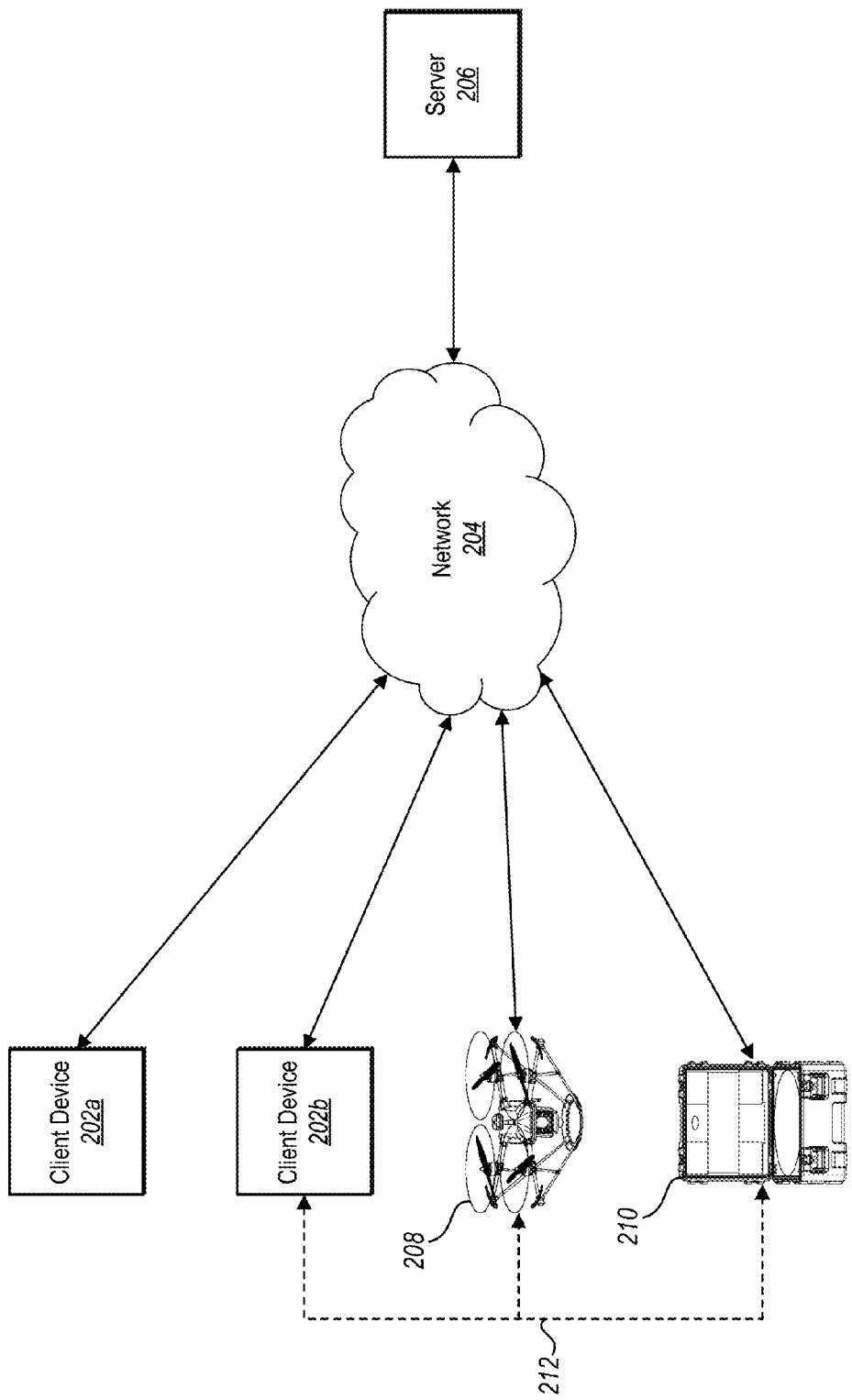

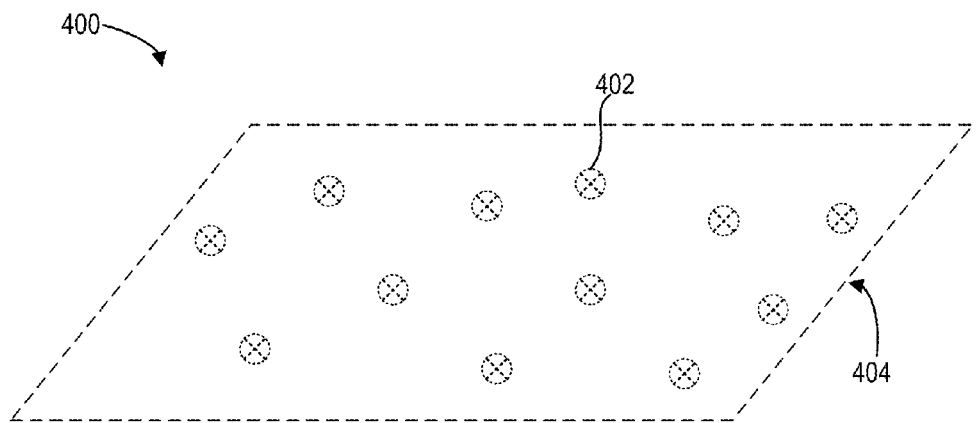
*Fig. 4A*
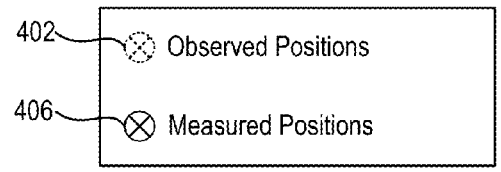
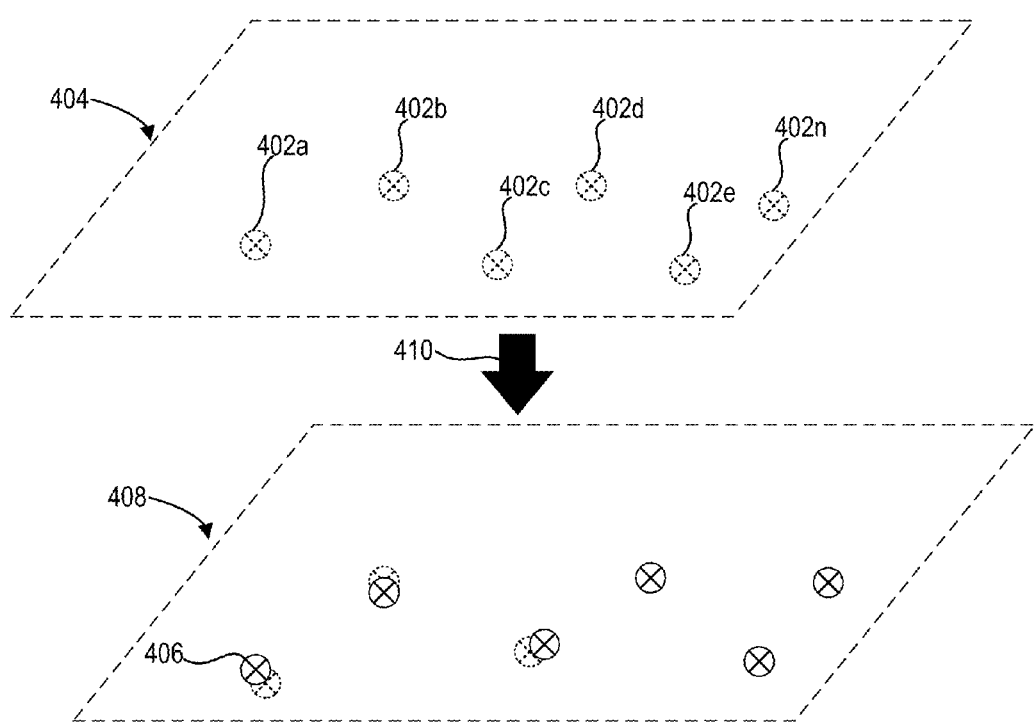
*Fig. 4B*

GENERATING GEOREFERENCE INFORMATION FOR AERIAL IMAGES

BACKGROUND

1. Technical Field

One or more embodiments of the present disclosure relate generally to georeference information. More specifically, one or more embodiments of the present disclosure relate to systems and methods for generating georeference information for aerial images.

2. Background and Relevant Art

Recent years have seen a rapid increase in the use of digital aerial images in various applications. In particular, given the recent proliferation of unmanned aerial vehicles (UAVs) in commercial and industrial applications, digital aerial photography has become more common in individual and business environments. For instance, individuals now commonly utilize UAVs to capture digital aerial images of homes, places of interest, or even recreational activities.

In many applications, however, individuals and businesses find it imperative to tie digital aerial image data to precise geographic locations. For example, in a construction application, a design company may find it critical to determine the location of structures as they exist in situ and/or the location of structures progressing during construction. Indeed, many applications require digital aerial image data that corresponds to accurate real-world coordinates with only centimeters of permissible variance.

To accomplish this objective, many common digital image systems capture images tied to known georeference locations. For instance, common image systems place visible ground control points (i.e., markers) at known geographic locations before capturing digital image data. Common image systems then determine the precise geographic location of features within captured images based on these known points.

Although systems that utilize markers permit users to relate digital image data to known ground control points with remarkable accuracy, such systems introduce their own problems. For instance, businesses commonly need updated aerial imagery of a site over a period of days, weeks, months, or years. Common systems require users to place, or maintain, ground control points each time users seek to capture digital aerial imagery. Thus, for example, a business operating an active construction site may desire updated digital aerial image data related to construction progress at the end of each week, requiring users to place markers every week to produce accurate georeferenced image data. Because placing the markers may require specialized expertise and surveying equipment, this process can result in excessive costs in both time and expense.

Moreover, in some instances, users may forget to place markers (or may inaccurately place markers) when capturing aerial image data. Such situations may result in additional wasted time and expense, as users are required to recapture image data or proceed without accurate georeference information. Furthermore, in some applications, it may not be possible to access a site to replace or maintain ground control points. For example, in taking digital aerial images at remote locations (or in locations that experience extreme temperatures or other weather conditions) it may be impossible, or impractical, to repeatedly establish ground control points or maintain ground control points over time.

Accordingly, a number of problems and disadvantages exist with conventional systems for creating georeferenced digital aerial images using temporary ground control points.

BRIEF SUMMARY

Embodiments of the present disclosure provide benefits and/or solve one or more of the foregoing or other problems in the art with systems and methods that generate georeference information with regard to aerial images. For instance, one or more embodiments include systems and methods that utilize existing aerial images with georeference information (e.g., ground control points) to create georeference information for aerial images captured without such information. In particular, in one or more embodiments, systems and methods use various means to compare features of aerial images captured without georeference information to images captured with georeference information, and create georeference information with regard to the new aerial images.

For example, one or more embodiments include systems and methods that access a first set of aerial images of a site showing known ground control points. From the first set of images, systems and methods can build an initial unreferenced three-dimensional representation and generate a transformation to the known ground control points. Systems and methods can then access new aerial images of the site that do not show known ground control points. In one or more embodiments, the disclosed systems and methods utilize the new aerial images and the initial unreferenced three-dimensional representation to build a new unreferenced three-dimensional representation. The disclosed systems and methods can then apply the generated transformation to the new unreferenced three-dimensional representation to create a new georeferenced three-dimensional representation. In one or more embodiments, systems and methods utilize the new georeferenced three-dimensional representation to generate a georeferenced three-dimensional model or use the new georeferenced three-dimensional representation to create a georeferenced orthomap of the site.

The disclosed systems and methods permit users to avoid the time and expense associated with repeatedly placing or maintaining ground control points at a site over time. Because the disclosed systems and methods can generate georeference information for aerial images based on existing image data, users can capture aerial images containing georeference information (e.g., ground control points) a single time, capture new aerial images without georeference information at subsequent times, and still correlate features within the new aerial images to precise geographic locations.

The disclosed systems and methods permit users to obtain georeference information for images captured (either purposefully or unintentionally) without ground control points (or GPS information). For example, if in utilizing a UAV to capture aerial images, a user accidentally fails to place ground control points (or inaccurately records the location of ground control points), the disclosed systems and methods permit the user to correlate the captured image data with a precise location on Earth.

Moreover, the disclosed systems and methods provide accurate georeference information. For instance, utilizing one or more of the disclosed systems and methods, users can correlate aerial image data to real-world geographic coordinates within centimeters of accuracy, despite the fact that aerial images were not originally captured with georeference information. Systems and methods can accomplish these results despite changes to ground conditions, changes in illumination, changes in perspective amongst the various images, variations in camera parameters, changes in camera location (e.g., elevation, aerial location, etc.), and other changes.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 2 illustrates a schematic diagram of an exemplary environment in which the image georeferencing system of FIG. 1 can operate in accordance with one or more embodiments;

FIG. 4A illustrates a representation of observed positions of ground control points in a three-dimensional representation in accordance with one or more embodiments;

FIG. 4B illustrates a representation of a transformation between observed positions of ground control points in a three-dimensional representation to measured positions of ground control points in accordance with one or more embodiments;

DETAILED DESCRIPTION

Figure 1:
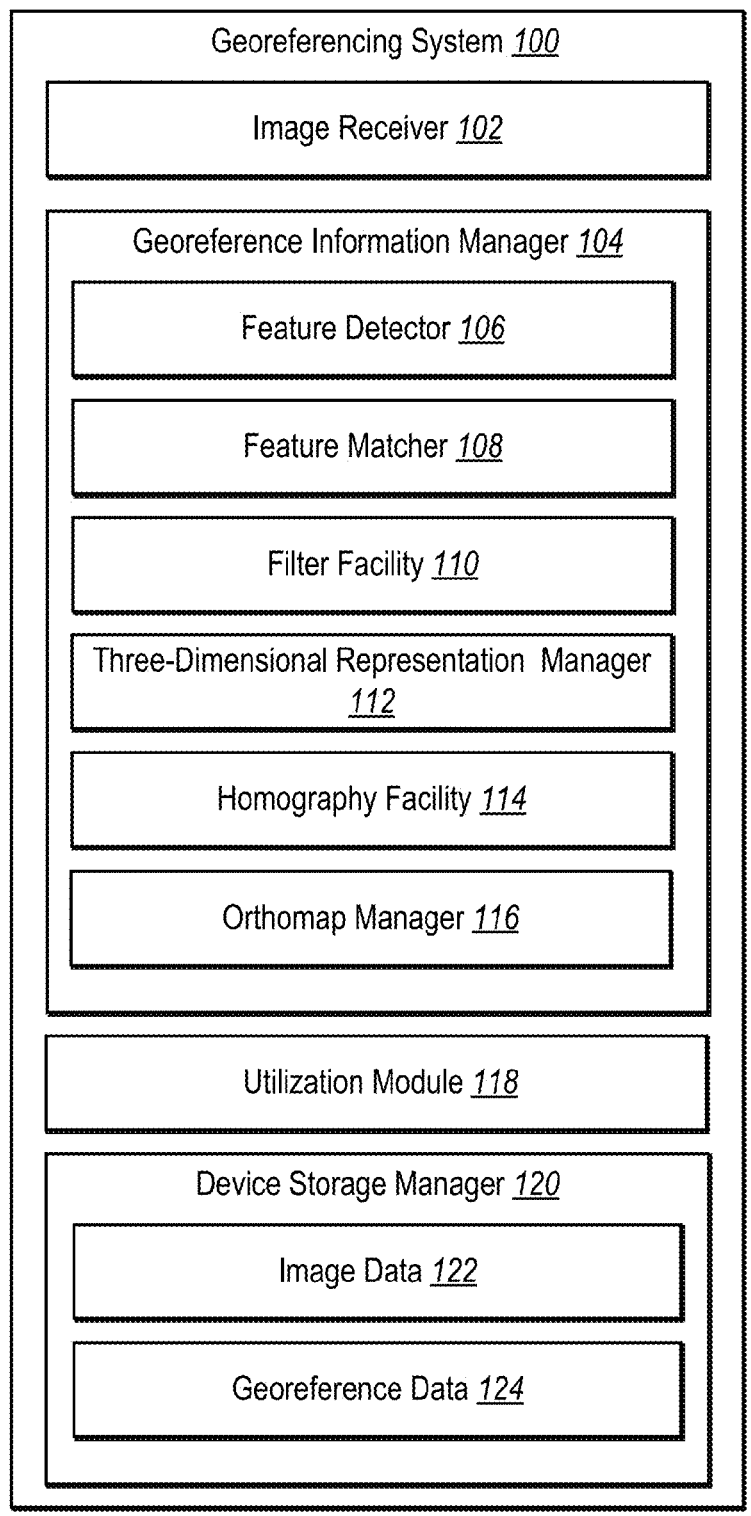
FIG. 1 illustrates a schematic diagram of an image georeferencing system in accordance with one or more embodiments.

One or more embodiments of the present disclosure include an image georeferencing system that generates georeference information related to one or more aerial images. In particular, in one or more embodiments the georeferencing system utilizes existing aerial images captured with georeference information (e.g., ground control points) to generate georeference information for aerial images captured without such information. More specifically, the image georeferencing system utilizes various methods to compare features of existing aerial images with georeference information to the features of new aerial images captured without georeference information to generate georeference information related to the new aerial images.

For example, in one or more embodiments the image georeferencing system accesses a set of aerial images of a site showing known ground control points and builds an unreferenced three-dimensional representation based on the set of aerial images. The image georeferencing system then generates a transformation relating the unreferenced three-dimensional representation to the known ground control points. The image georeferencing system then accesses a new set of aerial images of the site without known ground control points. Utilizing the new set of aerial images and the unreferenced three-dimensional representation, the image georeferencing system builds a new unreferenced three-dimensional representation. The image georeferencing system then applies the generated transformation to the new unreferenced three-dimensional representation to create a new georeferenced three-dimensional representation. The image georeferencing system can utilize the new georeferenced three-dimensional representation, for example, to produce a three-dimensional model or generate a georeferenced orthomap.

In addition, in one or more embodiments the image georeferencing system can utilize a georeferenced orthomap (e.g., from the embodiment just described) to generate georeference information for one or more additional images captured without georeference information. In particular, the image georeferencing system can access a georeferenced orthomap and a second aerial image, match features from the georeferenced orthomap with features from the second aerial image, and compute a homography relating the georeferenced orthomap and the second aerial image. Utilizing the homography, the image georeferencing system can update the georeferenced orthomap based on the new aerial image.

Moreover, in one or more embodiments the image georeferencing system can generate ground control points for an image captured without ground control points. For example, one or more embodiments of the image georeferencing system access a set of aerial images of a site showing known ground control points and a new aerial image of the site not showing ground control points. The image georeferencing system compares one or more features from the set of aerial images with one or more features from the new aerial image. Based on the comparison, the image georeferencing system generates georeference information (e.g., ground control points) for the new aerial image.

By generating georeference information based on existing aerial images, the georeferencing system permits a user to accurately tie new aerial images to a precise location on Earth, even when the new aerial images are captured without georeference information. Thus, users can obtain accurate georeferenced images of a site over time, without repeatedly placing ground control points. Similarly, users can obtain accurate georeferenced images where ground control points were accidentally omitted, or inaccurately measured.

Advantageously, the image georeferencing system can account for variations in perspective effect, optical characteristics, illumination, equipment, and ground conditions. For instance, in capturing aerial images over time, the perspective (e.g., location, rotation, angle, viewpoint), illumination (e.g., brightness, color, lighting, etc.), camera calibration, and other optical characteristics will vary from image to image. Similarly, with regard to aerial images captured days, weeks, or months apart, the ground conditions can change substantially with regard to mobile items (e.g., cars, equipment, people, etc.), scenery (change of season, adding or removing landscaping, etc.), structural items (e.g., removal or construction of buildings, roads, etc.), or other conditions.

In one or more embodiments, the image georeferencing system accounts for changes in ground conditions by utilizing one or more filters. In particular, the image georeferencing system can identify common features between images by applying a filter that identifies outliers and/or removes features. Thus, for example, the image georeferencing system can filter out cars, people, or other items that move between images.

Similarly, in one or more embodiments, the image georeferencing system accounts for variations in perspective effect, optical characteristics, illumination, and equipment by utilizing one or more algorithms. For example, the image georeferencing system can account for variations by utilizing a structure from motion algorithm and a bundle adjustment algorithm to generate one or more three-dimensional representations (e.g., point clouds). In other embodiments, the image georeferencing system accounts for variations by utilizing a homography to relate two perspectives of a planar surface (e.g., representations of the same location in two images) while blending other visual variations.

Moreover, one or more embodiments of the image georeferencing system reduce error accumulation (i.e., drift) with regard to three-dimensional representations. In particular, during sequential structure from motion processes, it is possible for errors to accumulate in three-dimensional representations (e.g., points in the three-dimensional representation can drift from accurate positions relative to either local or real-world coordinates). One or more embodiments of the image georeferencing system reduce such error by utilizing a constrained bundle adjustment. In particular, in one or more embodiments, the georeferencing system refines the accuracy of ground control points and applies an additional bundle adjustment algorithm constrained by the refined ground control points to correct for drift in three-dimensional representations.

To further assist a user in obtaining accurate geographic information quickly, in one or more embodiments, the image georeferencing system operates during flight of a UAV. For example, a user can load an existing georeferenced orthomap to the computer system of a UAV. During flight, the UAV can capture a new image and generate georeference information for the new image. Furthermore, in one or more embodiments, the UAV can utilize the georeference information with regard to the new image. For example, the UAV can utilize the georeference information to determine the location of the UAV, identify areas to capture additional images, and/or navigate the UAV during flight.

Individuals and businesses can utilize georeference information generated by the image georeferencing system in a variety of applications. As just discussed, the image georeferencing system can utilize georeferenced images for navigation. In addition, the image georeferencing system can utilize georeferenced images in construction applications. For example, the image georeferencing system can provide georeferenced images for display to assist in generating site maps, creating construction schedules, identifying construction progress, estimating expected costs, locating site features, modifying a site or design, building or demolishing a structure, designing improvements, creating aerial image overlays for design plans, generating as-built plans, comparing actual construction realities with designed plans, or any other construction related process that relies upon updated and accurate mapping. Indeed, in design-build applications, engineering and construction professionals design improvements during the construction process; thus, continuously updated georeferenced images can aid in the ongoing engineering and construction process. Thus, the georeference imaging system can assist in decisions and policies regarding the timing, pricing, scheduling, designing, progress, and completion of construction projects.

Aside from construction, the image georeferencing system can also provide georeferenced images or georeference information to assist in decisions and policies in the fields of mining, agriculture, wildfire surveillance/mapping, land preservation, real estate, hydrology, land use planning, surveillance, security, livestock monitoring, disaster relief, archeology, and other fields. For instance, in open-faced mining, the image georeferencing system can be utilized for locating target mining areas, tracking mining progress, estimating available mining materials, and other activities.

As used herein, the term "georeference information" refers to information that relates image data to a known location relative to the Earth. In particular, georeference information can relate all or a portion of an image to coordinates relative to the Earth based on a coordinate system. For example, georeference information can include information relating an image feature (or other part of an image) to a latitude, longitude, township, range, section, quarter section, quarter-quarter section, meridian, baseline, arpent, site reference, local reference, or other coordinate system or reference. Similarly, georeference information can comprise one or more directions and/or distances from recognized survey landmarks, markers, structures, or monuments, such as a section corner. In addition, georeference information can comprise one or more directions and/or distances from a known location associated with a beacon, transmitter, or other device capable of transmitting information to a sensor (e.g., a sensor associated with a UAV). Thus, georeference information can comprise a data point (e.g. in a point cloud) defined by coordinates relative to a location on earth; ground control points shown on an orthomap defined relative to a location on earth; or ground control points shown on an another aerial image defined relative to a location on earth. Georeference information can include location information obtained from any source, including a global positioning system (GPS), a ground control point, a marker, a tag, a survey, or any combination thereof. For example, georeference information can include a point shown on an image together with survey data identifying the known location on Earth of the point. Similarly, georeference information can include GPS information related to the position of a UAV relative to the Earth at the time a camera on board the UAV captures an image.

As just discussed, georeference information can include one or more ground control points. As used herein, the term "ground control points" refers to points on the surface of the Earth of known location. For example, ground control points can include temporary or permanent markers placed at known locations of the Earth. Ground control points may be visible to a UAV during flight. A ground control point can comprise any variety of markers, tags, or identifiers, including signs, painted marks, taped marks, mobile platforms, boards, or any other markers visible to a UAV during flight. In particular, a ground control point can include a temporary marker that looks like an "X" placed on the Earth such that it is visible from the air. The location of the ground control point may be measured prior to capturing an image, after capturing an image, prior to placing a marker, or after placing a marker. For example, a surveyor may determine the location of a particular spot utilizing surveying equipment, the surveyor may mark the spot with a temporary marker visible from the air, and a UAV may capture images showing the temporary marker during flight.

As used herein, the term "site" refers to any portion of a geographic area for which aerial image data is desired. For instance, a site may include a geographic area containing geography, structures, vegetation, or other items of interest. For example, a site may refer to a construction site, a mining area, a field, a plot of real estate, a disaster area, or some other geographic region.

As used herein, the term "orthomap" or "orthophoto" refers to a geometrically corrected aerial image portraying a uniform scale. In particular, an orthomap can comprise a geometrically corrected aerial image where the effects of tilt and relief have been removed. Because an orthomap portrays a uniform scale, it is possible to measure distances directly from an orthomap. For example, a construction manager can utilize an orthomap of a construction site to accurately measure the distance between objects appearing on the orthomap. Similarly, a designer can overlay, and match, an orthomap to existing scaled design plans.

As used herein, the term "three-dimensional representation" refers to any digital data depicting a three-dimensional object or site. The term three-dimensional representation includes a three-dimensional point cloud, a three-dimensional mesh, a three-dimensional surface, or any other representation derived from the observation of a point or landmark from a single or multiple views.

As used herein, the term "point cloud" refers to a set of data points in a coordinate system. In particular, the term point cloud may refer to a set of data points on a three-dimensional coordinate system. For instance, a point cloud may refer to the set of data points on a three-dimensional coordinate system that represent the external surface of one or more objects. More specifically, a point cloud may refer to the set of data points on a three-dimensional coordinate system that represent a particular location of the Earth, a construction site, a building, a mine, and/or some other three-dimensional object or feature.

As used herein, the term "georeferenced" refers to data that is referenced to a known location on the Earth. For instance, a georeferenced orthomap refers to an orthomap that is referenced to a known location on Earth (e.g., shows or is tied to a known ground control point). Similarly, a georeferenced three-dimensional representation is a three-dimensional representation where the location of the three-dimensional representation is tied to a known location on Earth (e.g., where points in a three-dimensional point cloud are defined in reference to real-world coordinates).

In contrast, as used herein, the term "unreferenced" refers to data that is not referenced to a known location on the Earth. For example, an unreferenced orthomap comprises an orthomap that is not tied to ground control points. Similarly, an unreferenced three-dimensional representation comprises a three-dimensional representation with three-dimensional digital data not defined relative to a location on Earth (e.g., a point cloud whose coordinate system and/or data points are not defined relative to a location on Earth). To illustrate, a user of the image georeferencing system can utilize a set of images to create an unreferenced point cloud (i.e., a point cloud whose coordinates are consistent relative to other images, thus creating a three-dimensional representation, but whose coordinates are not defined in relation to a location on Earth). By utilizing ground control points, one or more embodiments of the image georeferencing system can apply a transformation that modifies the point cloud, such that each point in the point cloud is defined by coordinates relative to a location on Earth (e.g., distance and/or direction from a section corner or other survey point).

Turning now to FIG. 1, additional detail will be provided regarding components and capabilities of one or more embodiments of the image georeferencing system. In particular, FIG. 1 shows a schematic diagram illustrating an example embodiment of an image georeferencing system ("georeferencing system") 100. As shown in FIG. 1, in one or more embodiments, the georeferencing system 100 includes an image receiver 102, a georeference information manager 104, a utilization module 118, and a device storage manager 120. As illustrated, the georeference information manager 104 may also include a feature detector 106, a feature matcher 108, a filter facility 110, a three-dimensional representation manager 112, a homography facility 114, and an orthomap manager 116. Moreover, the device storage manager 120 may also include, as shown, image data 122 and georeference data 124.

Each of the components 102-120 of the georeferencing system 100 and their corresponding elements may be in communication with one another using any suitable communication technologies. It will be recognized that although components 102-120 are shown to be separate in FIG. 1, any of components 102-120 may be combined into fewer components, such as into a single component, divided into more components, or configured into different components as may serve a particular embodiment. Moreover, one or more embodiments of the georeferencing system 100 may include additional components or fewer components than those illustrated in FIG. 1.

The components 102-120 and their corresponding elements can comprise software, hardware, or both. For example, the components 102-120 and their corresponding elements can comprise one or more instructions stored on a computer-readable storage medium and executable by processors of one or more computing devices. When executed by the one or more processors, the computer-executable instructions of the georeferencing system 100 can cause one or more computing systems (e.g., one or more server devices) to perform the methods and provide the functionality described herein. Alternatively, the components 102-120 can comprise hardware, such as a special purpose processing device to perform a certain function or group of functions. Additionally or alternatively, the components 102-120 can comprise a combination of computer-executable instructions and hardware.

Furthermore, the components 102-120 of the georeferencing system 100 and their corresponding elements may, for example, be implemented as one or more stand-alone applications, as one or more modules of an application, as one or more plug-ins, as one or more library functions or functions that may be called by other applications, and/or as a cloud-computing model. Thus, the components 102-120 of the georeferencing system 100 and their corresponding elements may be implemented as a stand-alone application, such as a desktop or mobile application. Furthermore, the components 102-120 of the georeferencing system 100 may be implemented as one or more web-based applications hosted on a remote server. Alternatively or additionally, the components of the georeferencing system 100 may be implemented in a suite of mobile device applications or "apps."

As previously mentioned, and as illustrated in FIG. 1, the georeferencing system 100 may include the image receiver 102. In one or more embodiments, the image receiver 102 receives, gathers, captures, accesses, provides, and/or identifies one or more images and related data for utilization by the georeferencing system 100. In particular, the image receiver 102 can access or capture one or more aerial images. In one or more embodiments, the image receiver 102 accesses one or more aerial images previously captured by a UAV (e.g., and uploaded to the georeferencing system 100). Similarly, the image receiver 102 can capture one or more aerial images from aboard a UAV.

The image receiver 102 can perform its functions with regard to a variety of aerial images. For example, the image receiver 102 can receive, access, or capture color images, black and white images, gray-scale images, microwave images, infrared images, ultra violet images, x-ray images, or gamma ray images. Similarly, the image receiver 102 can receive, access, or capture images in a variety of formats, including, but not limited to, TIFF, JPEG, PNG, GIF, or other image types. The georeferencing system 100 can utilize any images described herein to perform its functions.

In addition to images, the image receiver 102 can also receive, gather, capture, access, provide, or identify data related to one or more images. For instance, the image receiver 102 can access or capture date and time data associated with one or more images, georeference information associated with one or more images, or other image data. In particular, the image receiver 102 can capture images containing one or more ground control points and access corresponding data related to the location of the one or more ground control points. Similarly, the image receiver 102 can capture GPS data associated with one or more images. For example, the image receiver 102 can obtain GPS data related to the location of a UAV at the time a camera on board the UAV captures one or more images.

As shown in FIG. 1, the georeferencing system 100 may also include the georeference information manager 104. The georeference information manager 104 can access, create, calculate, generate, produce, provide, modify, and/or project georeference information. As further outlined below with regard to its individual components, the georeference information manager 104 can generate georeference information with regard to one or more aerial images, orthomaps, three-dimensional representations, or point clouds. Moreover, the georeference information manager 104 can create georeference information utilizing any number of tools, algorithms, or methods.

For instance, in one or more embodiments, the georeference information manager 104 compares a first set of images containing ground control points (e.g., images captured from image receiver 102) to a new set of images without ground control points. In particular, the georeference information manager 104 identifies key features (e.g., utilizing feature detector 106) matches features from the first set of images to features from the new set of images (e.g., utilizing feature matcher 108), filters out outliers, erroneous matches, and/or undesired objects or features (e.g., utilizing filter facility 110), and utilizes the matched (and/or filtered) features to generate georeference information with regard to the new set of images.

For example, the georeference information manager 104 can utilize matched features to generate georeference information in the form of a georeferenced three-dimensional representation (e.g., a point cloud). As discussed above, a point cloud may consist of three-dimensional points corresponding to the features of a set of images. In one or more embodiments, the georeference information manager 104 generates a point cloud (e.g., utilizing three-dimensional representation manager 112) based on the first set of images and the new set of images. Moreover, and as described in more detail below, the georeference information manager 104 applies a transformation to the point cloud to generate a georeferenced point cloud from the first set of images and the new set of images.

Similarly, the georeference information manager 104 can utilize matched features to calculate a homography (e.g., utilizing the homography facility 114). In particular, the georeference information manager 104 can generate a homography that relates points from a first aerial image to a second aerial image. More specifically, the georeference information manager 104 can generate a homography that projects ground control points (e.g., georeference information) from a first aerial image to a second aerial image that did not originally show ground control points.

Moreover, the georeference information manager 104 can utilize matched features to generate georeference information in the form of a georeferenced orthomap. In particular, the georeference information manager 104 can generate a georeferenced orthomap (e.g., utilizing the orthomap manager 116) by identifying matched features from an original orthomap showing ground control points and a new image (not showing ground control points). Specifically, the georeference information manager 104 can generate a homography based on matched features between the original orthomap and the new image and project features of the new image onto the original orthomap to generate a new georeferenced orthomap. Additional detail will be provided regarding the specific functions of the georeference information manager 104 with regard to its individual components, as follows.

As just discussed, and as illustrated in FIG. 1, the georeference information manager 104 may include the feature detector 106. The feature detector 106 can detect and identify features in an image. In particular, the feature detector 106 can identify distinct features or key points in one or more aerial images. For example, the feature detector 106 can identify edges, corners, regions, structures, vegetation, or other objects (or portions of objects) within an image.

Particularly, the feature detector 106 can identify one or more ground control points within an image. For instance, in one or more embodiments, the feature detector 106 can automatically identify ground control points in an image based on one or more patterns. For example, the feature detector 106 can compare characteristics of a ground control point shown in an image (e.g., the shape, color, size, etc.) to one or more pre-defined patterns. Based on the comparison, the feature detector 106 can determine that a portion of an image comprises a ground control point. More specifically, the feature detector can identify a portion of an image containing a white "X," compare the white "X" to a pre-defined pattern (e.g., a white "X" pattern) and determine that the white "X" shown in an image is a ground control point.

Additionally, or alternatively, the feature detector 106 can identify ground control points based on user input. For instance, in one or more embodiments, the feature detector 106 can receive user input indicating that one or more points in a point cloud represent a ground control point. Similarly, in one or more embodiments, the feature detector 106 can receive user input identifying ground control points shown on an orthomap. User input in this context can include user input identifying the ground control points (e.g., selecting points representative of ground control points) and/or user input defining the location of the ground control points (e.g., user input of the coordinates of the ground control points).

The feature detector 106 may utilize a variety of algorithms to identify features. For example, one or more embodiments utilize a scale-invariant feature transform (or SIFT) to identify features. Other embodiments may utilize a speeded up robust features (SURF) algorithm, AKAZE, or another feature detector algorithm. Additionally or alternatively, the feature detector 106 may rely on user input to identify features.

Moreover, as shown in FIG. 1, the georeference information manager 104 includes the feature matcher 108. The feature matcher 108 identifies corresponding features between or among images, orthomaps, or three-dimensional representations. For instance, the feature matcher 108 may compare features identified by the feature detector 106 from different images and determine what features match from the different images. For example, the feature matcher 108 may compare the edge of a building in a first image and the edge of a building in a second image to determine whether the edge in the first image corresponds to the edge in the second image.

The feature matcher 108 may utilize a variety of algorithms to identify common features. For example, the feature matcher 108 may utilize classical cross-correlation feature matching, variance normalized cross-correlation feature matching, color-based mean-square-error feature matching, iterative closest point feature matching, or a SIFT algorithm.

In one or more embodiments, the feature matcher 108 utilizes user input to identify one or more common features.

In addition, as illustrated in FIG. 1, the georeference information manager 104 may also include the filter facility 110. In one or more embodiments, the filter facility 110 manages one or more filters and applies the one or more filters to one or more images or three-dimensional representations. For instance, the filter facility 110 can apply filters to assist in identifying common features between or among images, orthomaps, or three-dimensional representations. Moreover, the filter facility 110 can identify and filter out outliers and limit false matches. More specifically, in one or more embodiments, the filter facility 110 utilizes a random sample consensus (RANSAC) algorithm to identify outliers. The filter facility 110 may operate as a separate component of the georeferencing system 100 or it may operate as part of other components; for example, the three-dimensional representation manager 112, the feature matcher 108, the homography facility 114, and/or the orthomap manager 116 may communicate with the filter facility 110, or incorporate the functions of the filter facility 110 into their own operation.

For example, in comparing features between images captured on different dates, the georeferencing system 100 may erroneously determine that two different features shown in two images are actually a common feature shown in the two images. The filter facility 110 can apply one or more filters to identify and remove outliers so as to avoid skewing information generated by the georeferencing system 100. In this way, for example, the georeferencing system 100 can robustly estimate three-dimensional representations, orthomaps, and homographies despite the fact that inaccuracies (e.g., false matches) may initially appear in the data.

In addition to filtering features between images, the filter facility 110 can apply a filter to other types of data. For instance, as discussed in greater detail below, the filter facility 110 can identify and remove outliers with regard to observed positions of one or more ground control points. The filter facility 110 can identify outliers (e.g., utilizing RANSAC) in any data collected, utilized, or generated by the georeferencing system 100.

The filter facility 110 can modify various parameters of filters employed by the filter facility 110. For example, the filter facility 110 can modify parameters so that filters will identify additional, or fewer, outliers. For example, in comparing an image of a site on a first day with an image of the site on a different day, the images may contain a number of features that are similar, but slightly different. In such a circumstance, the filter facility 110 can modify parameters so that the applicable filter will be more sensitive to outliers (and thus, for example, avoid false matches).

The filter facility 110 can modify the parameters of one or more filters based on a variety of factors. In one or more embodiments, the filter facility 110 modifies filter parameters based on user input (e.g., a user defines modified filter parameters). In other embodiments, the filter facility 110 modifies filter parameters based on the date and/or time of captured images, the number of corresponding features between images, or some other factor. For example, if the georeferencing system 100 captures a first set of images a week apart from a second set of images, the filter facility 110 can modify filter parameters based on the relative difference in the time of capture between the two set of images.

The filter facility 110 can apply a number of different parameters in identifying outliers. For example, in comparing images the filter facility 110 may identify outliers based on geometry. Thus, for example, the filter facility 110 may require geometric consistency between features before permitting the feature matcher 108 to identify a common feature between two images. Similarly, the filter facility 110 may identify outliers based on color, orientation, pattern, position (e.g., position relative to another feature), or other factors.

In one or more embodiments, the filter facility 110 removes one or more features or objects from one or more images or three-dimensional representations (e.g., features identified and/or matched utilizing the feature detector 106 and the feature matcher 108). The filter facility 110 can remove such features or objects. For example, the filter facility 110 may remove temporary or mobile objects, such as vehicles, bikes, individuals, animals, or construction equipment. Similarly, the filter facility 110 may remove other undesired items, such as vegetation.

The filter facility 110 may also filter or modify other features. For example, in one or more embodiments the filter facility 110 can account for perspective effects, camera effects, or other effects. Similarly the filter facility 110 can modify one or more images such that the images can be approximated to a plane. For example, the filter facility 110 can modify an image with perspective effect so that the image is approximated to a plane for comparison to another image approximated to a plane. For instance, the filter facility 110 can generate an orthographic projection of a mesh obtained from a scene reconstruction algorithm (e.g. Poisson Reconstruction) where camera parameters corresponding to that image where found and, consequently, integrated into the output mesh.

The filter facility 110 can remove objects based on a number of factors. For example, the filter facility 110 can remove objects based on user input, shape, color, pattern, texture, comparison between one or more images, comparison between one or more features, or other factors. In particular, the filter facility 110 can compare an object in an image with a set of pre-defined patterns (e.g., shape of a vehicle) and remove the object based on a correspondence between the object in the image and one of the set of predefined patterns. Similarly, the filter facility 110 can remove an object based on the fact that the object appears at one location in a first image (or orthomap or three-dimensional representation) and appears at a second location in a second image (i.e., indicating that the object is mobile and/or temporary). Alternatively or additionally, the georeferencing system 100 can identify objects to remove based on user input. For example, a user can select (through user input provided via a computing device) objects (e.g., an automobile, vegetation, etc.) represented in an aerial image, orthomap, or three-dimensional representation that the filter facility 110 should remove.

In addition to the filter facility 110, as shown in FIG. 1, the georeference information manager 104 may also include the three-dimensional representation manager 112. The three-dimensional representation manager 112 can generate, calculate, create, modify, produce, receive, provide, transform, reference, and/or utilize one or more three-dimensional representations. In particular, the three-dimensional representation manager 112 can communicate with the image receiver 102 to obtain one or more images and create one or more three-dimensional representations from the one or more images. Similarly, the three-dimensional representation manager 112 may interact with the feature detector 106, the feature matcher 108, and the filter facility 110, to identify features, compare images or three-dimensional representations, and generate or modify three-dimensional representations.

The three-dimensional representation manager 112 can generate one or more unreferenced three-dimensional representations in a number of ways. In particular, the three-dimensional representation manager 112 can create an unreferenced three-dimensional representation based on one or more images of a site. For instance, the three-dimensional representation manager 112 can utilize one or more algorithms to convert two-dimensional images into an unreferenced three-dimensional representation. For example, in one or more embodiments the three-dimensional representation manager 112 utilizes a structure from motion algorithm (e.g., applies a sequential or iterative structure from motion algorithm utilizing a plurality of images) to generate a three-dimensional point cloud from a set of two-dimensional images with a certain degree of overlap.

The three-dimensional representation manager 112 can also generate georeferenced three-dimensional representations. For example, in one or more embodiments the three-dimensional representation manager 112 can utilize georeference information related to one or more images to generate a georeferenced point cloud. In particular, the three-dimensional representation manager 112 can identify ground control points shown in one or more images and, based on the ground control points and the one or more images, generate a georeferenced point cloud, as explained in more detail below. Alternatively or additionally, the three-dimensional representation manager 112 can obtain GPS information related to one or more images (e.g., from the image receiver 102 or georeference data 124) and utilize the global position information to generate a georeferenced point cloud.

As mentioned previously, in some circumstances the process of generating geo-referenced three-dimensional representations (e.g., sequential structure from motion processes) can cause error accumulation, or drift. Accordingly, in one or more embodiments, the three-dimensional representation manager 112 can modify one or more three-dimensional representations to correct for such errors. In particular, one or more embodiments of the three-dimensional representation manager 112 refines ground control points and utilizes an additional constrained bundle adjustment algorithm based on the refined ground control points to correct for drift. In other words, the three-dimensional representation manager 112 can utilize refined ground control points as anchors to correct errors in a point cloud via a constrained bundle adjustment algorithm.

One or more embodiments of the three-dimensional representation manager 112 generates refined ground control points by comparing the observed three-dimensional positions of ground control points to the measured three-dimensional positions of the ground control points. For instance, as described in greater detail below, in one or more embodiments the three-dimensional representation manager 112 generates refined ground control points by calculating the observed positions of one or more ground control points from a plurality of aerial images; filtering the observed positions; and comparing the filtered, observed positions to the real-world, measured position of the ground control points.

Moreover, in one or more embodiments, the georeferencing system generates refined ground control points relative to the coordinate system of a point cloud. Accordingly, in one or more embodiments the three-dimensional representation manager 112 generates refined ground control points by further calculating a transformation. In particular, the three-dimensional representation manager 112 can calculate a transformation between filtered, observed positions of ground control points and measured positions of the ground control points. In addition, the three-dimensional representation manager 112 can apply the transformation inversely to convert the measured positions into the relative coordinate system of the point cloud. In this manner, the three-dimensional representation manager 112 can calculate refined ground control points relative to the point cloud (e.g., in terms of the coordinate system corresponding to the point cloud).

Moreover, in one or more embodiments, the three-dimensional representation manager 112 utilizes the refined ground control points to account for drift in a three-dimensional representation. For example, in some embodiments the three-dimensional representation manager 112 applies a constrained bundle adjustment algorithm to a three-dimensional representation (e.g., a three-dimensional point cloud) utilizing the refined ground control points. Specifically, in one or more embodiments, the three-dimensional representation manager 112 applies a bundle adjustment algorithm while setting the refined ground control points as constant, thus, holding the refined ground control points in place while applying the bundle adjustment algorithm to the three-dimensional representation. Similarly, one or more embodiments of the three-dimensional representation manager 112 apply a constrained bundle adjustment algorithm that weights the refined ground control points (e.g., applies a scaling factor to a cost or error value associated with the refined ground control points). By applying a constrained bundle adjustment algorithm in this manner, in one or more embodiments the three-dimensional representation manager 112 generates a corrected three-dimensional representation that corrects drift based on the measured position of ground control points.

In addition to generating point clouds that correct for accumulation errors, the three-dimensional representation manager 112 can also generate a georeferenced point cloud from an unreferenced point cloud. For instance, the three-dimensional representation manager 112 can identify one or more data points within an unreferenced point cloud, identify corresponding georeference information, and generate a georeferenced point cloud based on the georeference information. More specifically, in one or more embodiments, the three-dimensional representation manager 112 can identify one or more data points within an unreferenced point cloud that represent ground control points, and, based on the known location on Earth of the ground control points, convert the unreferenced point cloud to a georeferenced point cloud.

To generate a georeferenced point cloud from an unreferenced point cloud, in one or more embodiments the three-dimensional representation manager 112 utilizes a transformation. As used herein, the term "transformation" refers to an algorithm that modifies data within a three-dimensional space based on reference points (e.g., ground control points or GPS data). In particular, a transformation can modify rotation, scaling, and translation of data points within an unreferenced point cloud to relate the data points to corresponding geographic locations, thereby creating georeferenced data points. In other words, the transformation can modify an unreferenced point cloud based on known ground control points to generate a georeferenced point cloud, in which each of the points in the point cloud are defined in relation to a location on Earth. In some instances, the three-dimensional representation manager 112 can utilize a Helmert transformation algorithm to transform an unreferenced point cloud into a georeferenced point cloud.

In one or more embodiments, the three-dimensional representation manager 112 can also access a transformation generated from a first point cloud and apply the transformation to a second point cloud. For example, the three-dimensional representation manager 112 can apply a previously generated transformation to a new unreferenced point cloud to create a georeferenced point cloud. For instance, as discussed above, the three-dimensional representation manager 112 can generate an initial point cloud based on a first set of images of a site and calculate an initial transformation based on ground control points reflected in the first set of images. Thereafter, the three-dimensional representation manager 112 can access a new set of images of the site and generate a new point cloud based, at least in part, on the new set of images. Because the three-dimensional representation manager 112 had already calculated a transformation in relation to the first set of images (and, in some examples, data from the first set of images provides structure to the new point cloud), the three-dimensional representation manager 112 can apply the initial transformation to generate a new georeferenced point cloud. In some examples, this process may include updating the initial point cloud with data from the new set of images and applying the transformation to the data from the new set of images.

Aside from generating a georeferenced three-dimensional representation from data representative of aerial images showing known ground control points, the three-dimensional representation manager 112 can further modify a three-dimensional representation. For example, in one or more embodiments the three-dimensional representation manager 112 modifies an existing three-dimensional representation generated from a first set of images based on one or more new images. In particular, the three-dimensional representation manager 112 can utilize one or more new images to update a three-dimensional representation generated from a first set of images. For example, the three-dimensional representation manager 112 can obtain a set of aerial images for a site captured on a first day, generate a point cloud based on the set of aerial images, obtain a new set of images for the site captured on a second day, and modify the point cloud based on the new set of images.

Additionally or alternatively, the three-dimensional representation manager 112 can also generate a single point cloud based on two sets of aerial images captured at different times. Thus, the three-dimensional representation manager 112 can access a set of aerial images for a site captured on a first day, access a new set of images for the site captured on a second day, and generate a point cloud based on both sets of aerial images.

In generating or modifying a three-dimensional representation, the three-dimensional representation manager 112 can prioritize one or more features. In particular, the three-dimensional representation manager 112 can emphasize the features of one image or the features of another image in generating a three-dimensional representation. For example, the three-dimensional representation manager 112 can prioritize one or more features based on the time an image was captured, the characteristics of a feature within an image, a comparison of features contained within a set of images, a confidence factor associated with one or more features, user input, and/or any other suitable factors.

In particular, the three-dimensional representation manager 112 may prioritize features of a later-captured image over the features of an earlier-captured image. For instance, a user may seek to generate a georeferenced three-dimensional representation with regard to the features of a site on a second day based on images captured on the second day, while only having access to georeference information with regard to images captured at the site on the first day. In one or more embodiments, the three-dimensional representation manager 112 can build a georeferenced point cloud based on both the images captured on the first day and the images captured on the second day, while prioritizing the features of the images captured on the second day.

Thus, for example, if images on the first day show a structure that is no longer shown on images from the second day, the three-dimensional representation manager 112 can generate a three-dimensional representation that does not reflect the removed structure. Similarly, if images on the first day do not show a structure, but images from the second day do show a new structure, the three-dimensional representation manager 112 can generate a three-dimensional representation that reflects the added structure. In addition, where images from the first day show a structure, and images from the second day show a modified structure, the three-dimensional representation manager 112 can generate a three-dimensional representation that reflects the modified structure. Where images from the first day and images from the second day show the same structure, the three-dimensional representation manager 112 can utilize both sets of images to generate a georeferenced three-dimensional representation.

Aside from the time of capture, the three-dimensional representation manager 112 may prioritize the features of one or more images based on user input. For instance, a user may provide user input identifying a particular set of images, and the three-dimensional representation manager 112 may prioritize the features in the identified set of images. Similarly, a user may select particular features from a particular set of images, and the three-dimensional representation manager 112 can prioritize those particular features in generating a three-dimensional representation.

As discussed above, the georeferencing system 100 can filter one or more features of an image or three-dimensional representation. Accordingly, in prioritizing features (and performing its other functions), the three-dimensional representation manager 112 and the georeferencing system 100 can filter features. For example, the three-dimensional representation manager 112 (e.g., in conjunction with the feature matcher 108 and the filter facility 110) can identify features appearing in one or more images and filter the images so that certain identified features do not appear in a three-dimensional representation.

In addition to the three-dimensional representation manager 112, as illustrated in FIG. 1, the georeference information manager 104 may also include the homography facility 114. The homography facility 114 can calculate, generate, estimate or create one or more homographies. As used herein, the term "homography" refers to a mapping from points in one view to points in another view. In particular, a homography can comprise a matrix, equation, or other mathematical construct relating a data point on a plane represented in a first image to the same point in the plane represented in a second image. Thus, for example, a homography can comprise a matrix that relates a pair of planar surfaces as viewed in multiple images. Stated differently, images of the same planar surface in space are related by a homography.

The homography facility 114 can calculate a homography relating data points from different aerial images. For example, the homography facility 114 can calculate a homography relating data points in a first image (e.g., an aerial image or an orthomap) to a data point in a second image (e.g., another aerial image or another orthomap). In one or more embodiments, the homography facility 114 generates a homography by identifying common features (e.g., from the feature detector 106 and the feature matcher 108) in a plurality of images and generating the homography based on the location of the common features in the plurality of images.

As mentioned, the homography facility 114 can calculate a homography capable of relating points in a first image to points in a second image. Accordingly, the homography facility 114 can calculate a homography capable of relating a ground control point shown in a first image to a location on a second image, in which the ground control point is not shown. More particularly, the homography facility 114 can calculate the location of ground control points in reference to an image captured without ground control points based on an image showing ground control points.

The georeferencing system 100 and the homography facility 114 can account for outliers or inaccuracies in data (e.g., by utilizing the filter facility 110). For example, the homography facility 114 can account for inaccuracies in calculating a homography utilizing common features between images. For example, in one or more embodiments the georeferencing system 100 utilizes a RANSAC algorithm to estimate a homography while accounting for outliers in the data. Thus, the homography facility 114 can robustly estimate a homography that is not unduly affected by outliers or inaccurate feature matches.

Furthermore, as illustrated in FIG. 1, the georeference information manager 104 may also include the orthomap manager 116. The orthomap manager 116 can receive, generate, create, modify, or provide one or more orthomaps. In particular, the orthomap manager 116 can generate a georeferenced orthomap. For example, the orthomap manager 116 can generate a georeferenced orthomap for one or more images captured without georeference information.

In one or more embodiments, the orthomap manager 116 can utilize a homography (e.g., a homography generated by the homography facility 114) to generate a georeferenced orthomap. For example, in one or more embodiments, the orthomap manager 116 can utilize a homography relating points on a georeferenced orthomap and points on a new image to generate a georeferenced orthomap showing features of the new image. Thus, the orthomap manager 116 can project a new image onto an orthomap.

Moreover, the orthomap manager 116 can generate an orthomap based on a three-dimensional representation. In particular, the orthomap manager 116 can generate a georeferenced orthomap utilizing a georeferenced point cloud. For example, the orthomap manager 116 can receive a georeferenced point cloud from the three-dimensional representation manager 112 and convert the georeferenced point cloud to a georeferenced orthomap.

As discussed above with regard to three-dimensional representation manager 112, in one or more embodiments the orthomap manager 116 can also prioritize one or more features. For instance, the orthomap manager 116 can prioritize the features of a plurality of new images in relation to the features of a plurality of other images. As mentioned previously the georeferencing system 100 and the orthomap manager 116 can prioritize features based on the time an image was captured, the characteristics of a feature within an image, a comparison of features contained within a set of images, user input, or some other feature.

In one or more embodiments, the orthomap manager 116 can modify one or more orthomaps. For example, the orthomap manager 116 can modify an orthomap based on a new image. In particular, the orthomap manager 116 can modify an orthomap to reflect features shown in a new image.

Additionally, the orthomap manager 116 can modify the appearance of an orthomap. For example, the orthomap manager 116 can modify the tone, hue, brightness, color, shade, or other visual characteristics of an orthomap. For example, if the orthomap manager 116 modifies or generates an orthomap based on a new image, the orthomap manager 116 can modify the visual characteristics of the orthomap based on the visual characteristics of the new image. Thus, the orthomap manager 116 can blend the new image and the orthomap. Alternatively or additionally, the orthomap manager 116 can preserve the visual characteristics of an orthomap and modify the visual characteristics of a new image to match the orthomap.

As illustrated in FIG. 1, the georeferencing system 100 may also include the utilization module 118. In one or more embodiments the utilization module 118 can provide data generated by the georeferencing system 100 to one or more users or devices. In particular, the georeferencing system 100 can provide, for display, images or georeference information to one or more users. For example, the utilization module 118 can provide for display to a user a representation or model of a georeferenced three-dimensional representation generated by the georeferencing system 100. Similarly, the utilization module 118 can provide for display a georeferenced orthomap or a georeferenced aerial image. Additionally or alternatively, the utilization module 118 can provide for display a three-dimensional representation, orthomap, or aerial image that identifies real-world location information generated by the georeferencing system 100.

The utilization module 118 can also provide for display images or georeference information in relation to other images, designs, plans, or graphics. For example, the utilization module 118 can provide for display a georeferenced orthomap generated by the georeferencing system 100 together with design plans. Specifically, the utilization module 118 can provide a georeferenced orthomap positioned so that the features of the georeferenced orthomap and design plans align according to their existing (or planned) location on Earth.

Similarly, the utilization module 118 can provide for display a comparison between or among one or more three-dimensional representations, orthomaps, and/or images. For example, the utilization module 118 can provide for display a georeferenced orthomap displaying the differences between a first georeferenced orthomap reflecting a site at a first point in time and a second georeferenced orthomap reflecting a site at a second point in time.

The utilization module 118 can also provide for display one or more reports, tables, charts, or summaries. For example, the utilization module 118 can provide a summary regarding the percentage change of a site as reflected by a comparison between images, orthomaps, and/or three-dimensional representations. Additionally or alternatively, the utilization module 118 can provide a report regarding the location of features, georeference information, or other information.

The utilization module 118 can also utilize images and/or georeference information. For example, the utilization module 118 can utilize images and or georeference information for navigation. Specifically, the utilization module 118 can utilize a georeferenced orthomap generated by the georeferencing system 100 to navigate a UAV. For instance, the utilization module 118 can provide a georeferenced orthomap for display to an individual navigating a UAN or the georeferencing system 100 can autonomously navigate the UAV utilizing a georeferenced orthomap.

As shown in FIG. 1, the georeferencing system 100 may also include the device storage manager 120. The device storage manager 120 maintains data for the georeferencing system 100. The device storage manager 120 can maintain data of any type, size, or kind, as necessary to perform the functions of the georeferencing system 100.

As illustrated, the device storage manager 120 may include image data 122. Image data 122 can include data representative of images captured, generated, received, modified, or otherwise utilized by the georeferencing system 100, including aerial images, orthomaps, three-dimensional representations, or other images. The image data 122 may additionally or alternatively include data associated with one or more images, such as metadata associated with one or more images. More particularly, image data 122 may include georeference information stored as metadata with regard to one or more images.

Furthermore, as illustrated, the device storage manager 120 may also include georeference data 124. Georeference data 124 may include data representative of georeference information or any other information regarding a location on Earth. In particular, georeference data 124 may include data relating features appearing within one or more images to corresponding locations on Earth. For instance, georeference data 124 can include data relating one or more structures or other features of a job-site to corresponding geographic coordinates representative of the geographic locations of the structures or other features on the earth's surface. Thus, for example, the georeference data 124 can include GPS data, geospatial data, or any other data that relates image data to corresponding geographic locations.

Turning now to FIG. 2, further information will be provided regarding implementation of the georeferencing system 100. Specifically, FIG. 2 illustrates a schematic diagram of one embodiment of an exemplary system environment ("system") 200 in which the georeferencing system 100 can operate. As illustrated in FIG. 2, the system 200 can include client devices 202a-202b, a network 204, a server 206, a UAV 208, and a ground station 210. The client devices 202a-202b, the network 204, the server 206, the UAV 208, and the ground station 210 may be communicatively coupled, as shown in FIG. 2. Although FIG. 2 illustrates a particular arrangement of the client devices 202a-202b, the network 204, the server 206, the UAV 208, and the ground station 210, various additional arrangements are possible. For example, the client devices 202a-202b (or the UAV 206 and/or ground station 210) may directly communicate with the server 206, bypassing the network 206. Similarly, in one or more embodiments the client devices 202a-202b may directly communicate with each other.

In yet other embodiments, the client 202b may communicate directly with the UAV 208, which may communicate directly with the ground station 210 via the local connection 212. The local connection 212 may comprise any recognized form of wired or wireless communication. For example, in one or more embodiments the client device 202b may include a mobile computing device (e.g., tablet) utilized by a UAV operator to communicate with the UAV 208 and the ground station 210. More specifically, a UAV operator may utilize client the device 202b to send information to, and receive information from, the UAV 208; the UAV 208 may dock with (and communicate with) the ground station 210; and the client device 202b, the UAV 208, and/or the ground station 210 can provide information to the server 206.

The georeferencing system 100 may be implemented in whole, or in part, by the individual elements 202a-210 of the system 200. For instance, the georeferencing system 100 may be implemented on client device 202a (e.g., the georeferencing system 100 may correspond to client device 202a). Similarly, the georeferencing system 100 may be implemented on the server 206. Alternatively or additionally, different components and functions of the georeferencing system 100 may be implemented separately among client devices 202a-202b, the server 206, the UAV 208, and the ground station 210. For instance, the image receiver 102 may be implemented as part of the client device 202c, the three-dimensional representation manager 112 may be implemented as part of the server 206, the utilization module 118 may be implemented as part of client device 202a, and the device storage manager 120 may be implemented as part of both client device 202a and the server 206.

The client devices 202a-202b, the network 204, the server 206, the UAV 208, and the ground station 210 may communicate using any communication platforms and technologies suitable for transporting data and/or communication signals, including any known communication technologies, devices, media, and protocols supportive of remote data communications, examples of which will be described in more detail below with respect to FIG. 11.

The client devices 202a-202b may comprise any computing device. For example, client devices 202a-202b may comprise one or more personal computers, laptop computers, mobile devices, mobile phones, tablets, special purpose computers, TVs, or other computing devices. Similarly, client devices 202a-202b may also comprise one or more UAVs, ground stations, or other computing devices.

As used herein, the term "UAV" or "unmanned aerial vehicle" refers to an aircraft that can be piloted autonomously or remotely by a control system. The UAV 208 may comprise any type of UAV, including micro UAV, low altitude UAV, or high altitude UAV, whether autonomously or remotely piloted. Similarly, the UAV 208 may include multi-rotor UAVs, single-rotor UAVs, blimp UAVs, or other types of UAVs. In particular, the UAV 208 may include an onboard computer that controls the autonomous flight of the UAV. In at least one embodiment, the UAV 208 is a multi-rotor vehicle, such as a quadcopter, and includes a carbon fiber shell, integrated electronics, a battery bay, a global positioning system ("GPS") receiver, a fixed or swappable imaging system (e.g., a digital camera), and various additional sensors and/or receivers. The UAV 208 may contain one or more computer-readable storage media and/or one or more processors with instructions stored thereon that, when executed by the one or more processors cause the UAV 208 to perform functions described herein.

Alternatively or additionally, the georeferencing system 100 may be implemented as part of ground station 210. The ground station 210 may be utilized to land, store, charge, or repair the UAV 208. Moreover, the ground station 210 may be utilized to communicate with the UAV 208 prior to, during, or after a flight.

Although FIG. 2 illustrates two client devices 208a-208b, the single UAV 208, and the single ground station 210, it will be appreciated that the client devices 202a-202b, the UAV 208, and the ground station 210 can represent any number of computing devices, UAVs, or ground stations (fewer or greater than shown). Moreover, client devices 202a-202b may comprise any client device (e.g., computing device) described herein, including those described with regard to FIG. 11.

In addition, and as illustrated in FIG. 2, the client devices 202a-202b, the server 206, the UAV 208, and the ground station 210 may communicate via the network 204. For example, the UAV 208 may communicate with the client device 202b, ground station 210, or the server 206 directly or via the network 204. Further, in one or more embodiments the server, the client device 202b, the ground station 210, or the server 206 can provide navigation information to the UAV 208. More particularly, the client device 202b, the ground station 210, or the server 206 may provide navigation information to the UAV 208 for purposes of navigating, taking off, and/or landing. Similarly, in one or more embodiments the UAV 208 may provide information to the client device 202b, the ground station 210, or the server 206 during or after flight. By way of further example, in at least one embodiment the UAV 208 may provide image data or georeference information to the client device 202b, the ground station 210, or the server 206. Further, the server 206 can provide images, communications, summaries, reports, or other data to device 202a (e.g., a personal computer operated by a user).

The network 204 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 204 may be any suitable network over which the client device 202a may access the server 206 and/or the client devices 202a-202d, or vice versa. The network 204 will be discussed in more detail below with regard to FIG. 11.

The server 206 may generate, store, receive, and transmit any type of data, including image data, georeference information, navigation information, or electronic communication data. For example, the server 206 may receive data from a client device, such as the client device 202a, and send the data to another client device, such as the client device 202b, 202c, and/or 202d. The server 206 can also transmit electronic messages between one or more users of the system 200. In one example embodiment, the server 206 is a data server. The server 206 can also comprise a communication server or a web-hosting server. Additional details regarding the server 206 will be discussed below with respect to FIG. 11.

In addition to the shown elements of system 200, one or more users may be associated with the client devices 202a-202d. Users may be individuals (i.e., human users). A user may interact with client devices 202a-202d by way of a user interface provided via a display device associated with client devices 202a-202d. For instance, a user can interact with the computing device 202a for the purpose of reviewing images or information provided by the georeferencing system 100 and/or deciding policies based on that information. Similarly, a user can provide user input via the client device 202a for operation of the georeferencing system 100. For example, one or more users can provide input of parameters, identify pertinent images to utilize, provide user input of commands to generate a three-dimensional representation, orthomap, or georeference information, etc.

To illustrate, in one or more embodiments, a UAV operator may seek to utilize the UAV 208 to capture aerial images of a site. The UAV operator may utilize client device 202b (e.g., a tablet or other mobile computing device) to send instructions to the UAV 208. The UAV 208 may fly from ground station 210 and capture images of the site. The UAV 208 may then provide image data to the ground station 210 and/or client device 202b. The client device 202b and/or the ground station 210 may convey the image data to the server 206 via the network 204. Furthermore, the UAV operator may obtain coordinates of ground control points, and send the ground control points from the client device 202b to the server 206 via the network 204. Thereafter, the server 206 may generate a georeferenced three-dimensional representation based on the image data and the coordinates of ground control points and send the georeferenced three-dimensional representation to client device 202a (e.g., a personal computer utilized by a designer).

At a later date, the UAV operator may seek to utilize the UAV 208 to capture new aerial images of the site (without ground control points). The UAV operator may again utilize the client device 202b, the UAV 208, and the ground station 210 to capture new image data and convey the image data to the server 206. The server 206 may generate a new georeferenced three-dimensional representation utilizing the new image data and the previously captured image data. The server 206 may then transmit the new georeferenced three-dimensional representation to the client device 202a.

Turning now to FIGS. 3A-3F, additional detail will be provided regarding generating georeference information utilizing the georeferencing system 100. In particular, FIGS. 3A-3F illustrate an exemplary embodiment for generating a georeferenced three-dimensional representation in accordance with one or more embodiments of the georeferencing system 100.

Figure 3A:
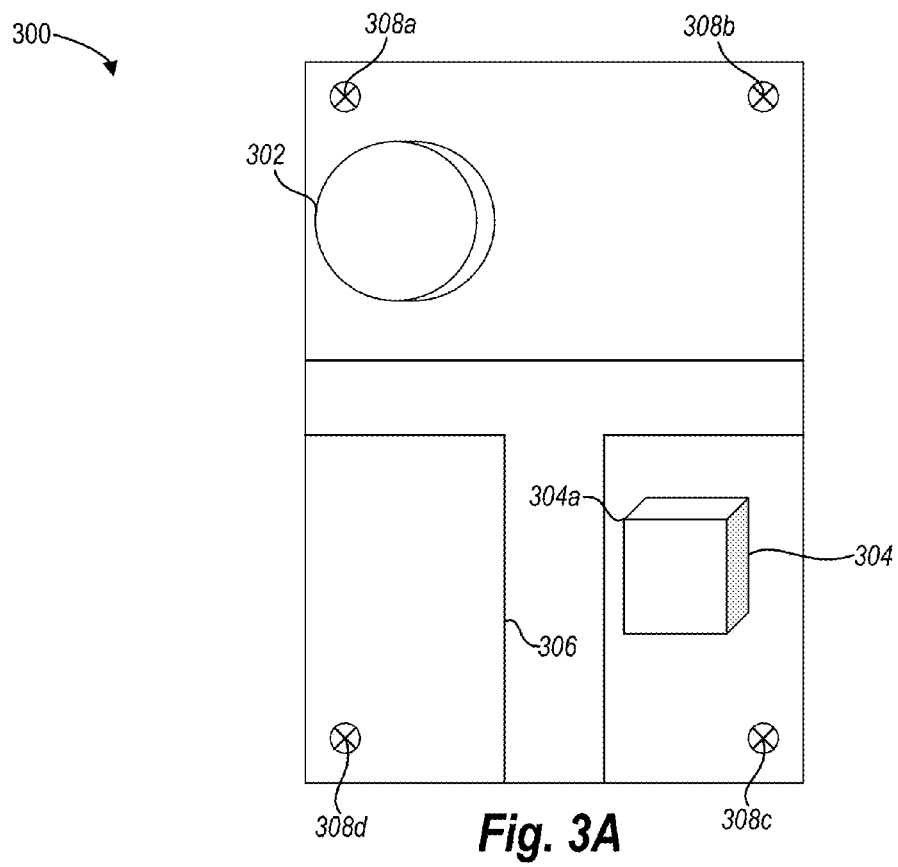
FIG. 3A illustrates a representation of one or more aerial images accessed in accordance with one or more embodiments.

FIG. 3A illustrates a representation of a plurality of images 300 captured or accessed by the georeferencing system 100. As illustrated, the plurality of images 300 show a first structure 302, a second structure 304, a road 306, and ground control points 308a, 308b, 308c, and 308d. Although FIG. 3A shows the first structure 302, the second structure 304, the road 306, and the ground control points 308a-308d, not every image in the plurality of images 300 need show each of these elements. For example, one image may only show one ground control point 308a and the road 306; another image may only show the first structure 302; and another image may show the second structure 304 and the ground control point 308d.

The georeferencing system 100 can capture the plurality of images 300 at varying times. For example, the georeferencing system 100 can capture the plurality of images 300 in a span of less than 15 minutes, less than an hour, or less than a day. Alternatively or additionally, the georeferencing system 100 may capture the plurality of images 300 in a span of multiple days, multiple weeks, multiple months, or even multiple years.

The ground control points 308a-308d represent known points on Earth (e.g., known points within a geographic coordinate system). In particular, the ground control points 308a-308d can represent temporary markers placed prior to capturing the plurality of images 300. The georeferencing system 100 can identify the location of the ground control points 308a-308d on Earth, for example based on a survey of the area and relation of the ground control points 308a-308d to known geographic coordinates (e.g. represented by survey monuments).

The georeferencing system 100 can obtain the location of the ground control points at any point in time. For example, a surveyor can measure the location of the ground control points 308a-308d on Earth prior to placing the ground control points. Similarly, a surveyor can measure the location of the ground control points 308a-308d after placing the ground control points, before the georeferencing system 100 captures the images, or after the georeferencing system 100 captures the images.

Figure 3B:
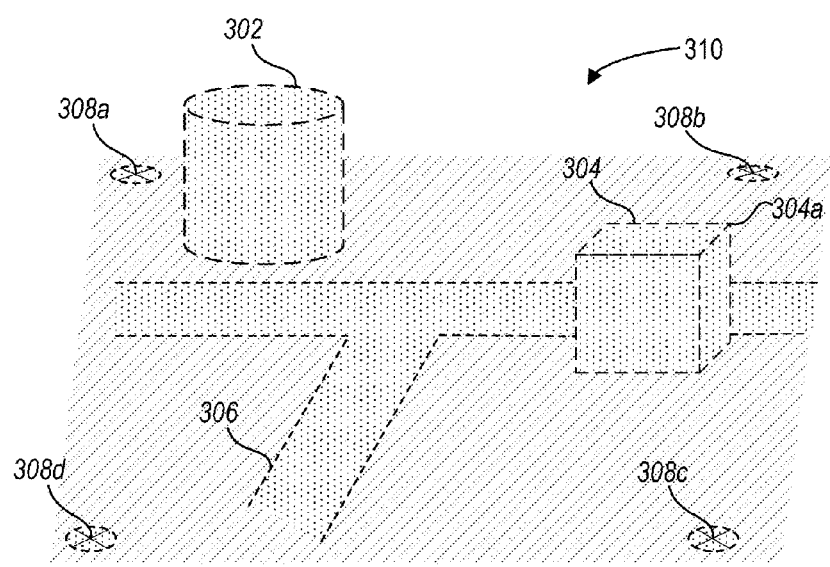
FIG. 3B illustrates a representation of an unreferenced three-dimensional representation generated in accordance with one or more embodiments.

FIG. 3B illustrates a representation of a three-dimensional representation in accordance with one or more embodiments. As illustrated, the georeferencing system 100 converts the plurality of images 300 into a three-dimensional point cloud 310. The data points in the point cloud 310 correspond to features of the plurality of images 300. For example, as illustrated, data points in the point cloud 310 correspond to the first structure 302, the second structure 304, the road 306, and the ground control points 308a-308d. Moreover, as illustrated in FIG. 3B, the point cloud may also contain data points representing other objects or features, for instance, points representing the contours of the ground and other geographic features (e.g., terrain, hills, valleys, mountains, etc.).

As mentioned previously, a point cloud can comprise a set of data points on a three-dimensional coordinate system. The georeferencing system 100 can generate a three-dimensional point cloud from a set of two-dimensional images. For example, the georeferencing system 100 can identify features in the plurality of images 300, and create three-dimensional data points corresponding to the identified features. In particular, variations in how features are portrayed in the plurality of images 300 (e.g., changes in perspective) permit the georeferencing system 302 to convert the features portrayed in the plurality of images 300 (e.g., two-dimensional images) to three-dimensional points. The georeferencing system 100 can combine three-dimensional points corresponding to features shown in the plurality of images 300 to generate a three-dimensional point cloud.

In one or more embodiments, the georeferencing system 100 utilizes a structure from motion algorithm to convert two-dimensional images to a three-dimensional point cloud. In particular, in one or more embodiments, the georeferencing system 100 compares the plurality of images 300, identifies features within the plurality of images 300, and determines matching features from the identified features. For example, with regard to FIG. 3A, the georeferencing system 100 can match an edge of the first structure 302 shown in a first image in the plurality of images 300 with the edge of the first structure 302 shown in a second image in the plurality of images 300.

Moreover, in one or more embodiments, the georeferencing system 100 tracks matching features from multiple images. For instance, the georeferencing system 100 can identify an edge of the second structure 304 in a first image of the plurality of images 300, identify the edge of the second structure 304 in a second image of the plurality of images 300, and track variations in the edge of the second structure 304 from image to image.

Moreover, in at least one embodiment, the georeferencing system 100 calculates feature trajectories by tracking matching features. For example, the georeferencing system 100 can calculate feature trajectories by tracking the edge of the second structure 304 in multiple images over time. Furthermore, in one or more embodiments the georeferencing system 100 utilizes the feature trajectories to construct a three-dimensional position of matching features.

Although the georeferencing system 100 can generate points within a three-dimensional point cloud based on two-dimensional images, in at least one embodiment, the georeferencing system 100 can generate points based on user input. For example, in one or more embodiments, the user can input (or identify) the ground control points in the point cloud.

In one or more embodiments, the georeferencing system 100 can also generate a georeferenced three-dimensional representation from GPS data. In particular, the georeferencing system 100 can estimate a camera position and latitude, longitude, and height utilizing GPS data. The georeferencing system 100 can convert the camera position to a projected referential. The projected referential can then be utilized to generate a georeferenced three-dimensional representation from the plurality of images 300.

Moreover, in one or more embodiments, the georeferencing system 100 accounts for variations in the plurality of images 300. For example, as described previously, the georeferencing system 100 can account for variations in perspective, calibration, and optical characteristics. In particular, the plurality of images 300 contains images captured at different locations, angles, perspectives, illuminations, and so forth. One or more embodiments of the georeferencing utilize a bundle adjustment to account for variations in the plurality of images 300 and generate a three-dimensional point cloud. A bundle adjustment is an algorithm that refines a visual reconstruction to produce jointly optimal three-dimensional structure and viewing parameters. For example, in one or more embodiments, the georeferencing system 100 utilizes the Levenberg-Marquardt bundle adjustment method. Similarly, the georeferencing system 100 can utilize the gradient descent bundle adjustment method, the Newton-Rhapson bundle adjustment method, and/or the Gauss-Newton bundle adjustment method.

Figure 3C:
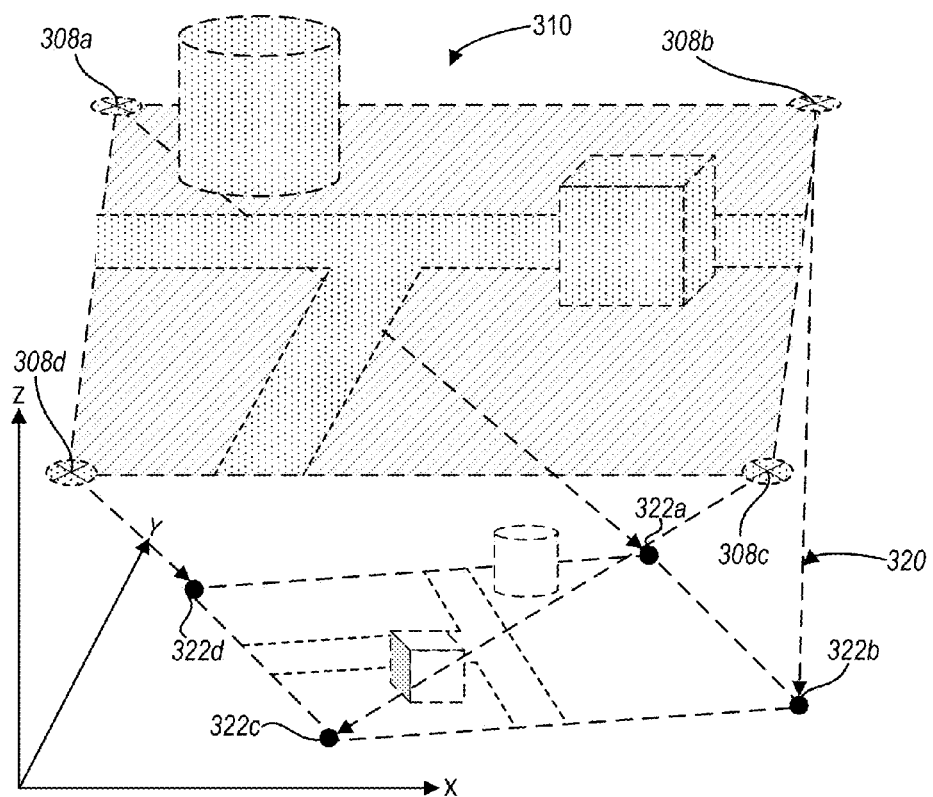
FIG. 3C illustrates a representation of a transformation applied to the unreferenced three-dimensional representation of FIG. 3B.

As discussed previously, the georeferencing system 100 can generate a transformation and/or apply a transformation to a point cloud. FIG. 3C illustrates a representation of applying a transformation to a point cloud in accordance with one or more embodiments. In particular, FIG. 3C represents the georeferencing system 100 applying a transformation 320 to the point cloud 310. The georeferencing system 100 utilizes the ground control 308*a*, 308*b*, 308*c*, and 308*d* in the point cloud 310 and the corresponding coordinate points 322*a*, 322*b*, 322*c*, and 322*d* to generate and apply the transformation 320.

In particular, the coordinate points 322*a*, 322*b*, 322*c*, and 322*d* represent the location on Earth of the ground control points 308*a*, 308*b*, 308*c*, and 308*d*. For instance, the coordinate points 322*a*-322*d* may comprise real-world coordinates of the ground control points 308*a*-308*d*, respectively. As described above, for example, the coordinate points 322*a*-322*d* may represent coordinates measured by a surveyor with regard to the location of temporary markers.

Utilizing the known coordinate points 322*a*-322*d* corresponding to the ground control points 308*a*-308*d*, the georeferencing system 100 can calculate and apply the transformation 320 to rotate, scale, and translate the point cloud 310. In particular, as shown, the georeferencing system 100 calculates and applies the transformation 320 such that ground control points 308*a*-308*d* align with the coordinate points 322*a*-322*d*. Moreover, the georeferencing system 100 applies the transformation 320 such that the remaining points in the point cloud 310 align with the location on Earth corresponding to each point. As such, the georeferencing system 100 calculates and applies the transformation 320 to generate a georeferenced point cloud.

For example, in constructing the point cloud 310, the georeferencing system 100 may build points in the point cloud 310 for the ground control points 308*a*-308*d* at the following coordinates, respectively: (0,0,50), (0,10,50), (10, 10,55), and (10, 0, 45). A surveyor may measure the ground control points and determine that the ground control points 308*a*-308*d* actually lie at the following coordinates relative to a section corner on the Earth: (1000, 3000, 10), (1001, 3011, 11), (1009, 3009, 16,) (1008, 999, 6). The georeferencing system 100 can generate and apply the transformation 320 that modifies (e.g., translates, rotates, and scales) the point cloud 310 such that the ground control points 308*a*-308*d* are located at the measured survey coordinates relative to the section corner on the Earth.

Similarly, the georeferencing system 100 can apply the transformation 320 to the data points corresponding to the first structure 302, the second structure 304, and the road 306 so that the data points are located at their corresponding coordinates relative to the section corner on the Earth. Thus, the georeferencing system 100 may build the point cloud 310 where the corner 304*a* of the second structure 304 is located at coordinate (7, 3, 0), and after applying the transformation 320, the corner 304*a* of the second structure 304 may be located at coordinate (1007, 3003, 10) relative to the section corner on the Earth.

Figure 3D:
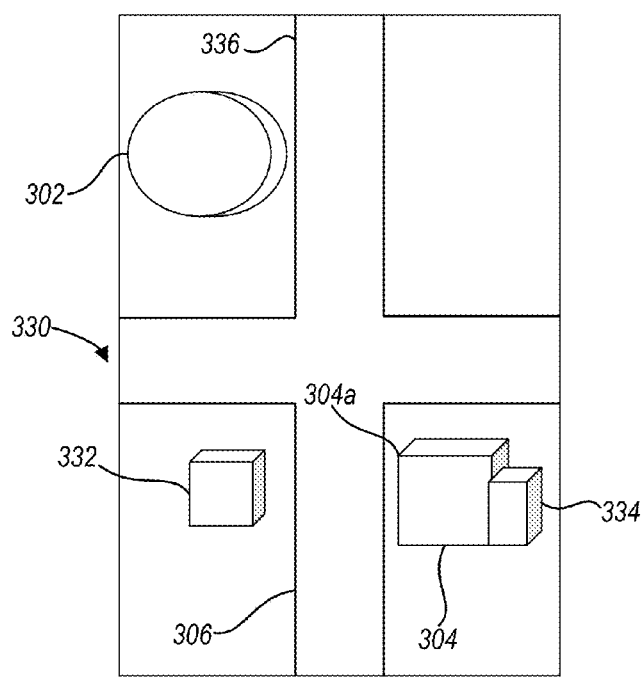
FIG. 3D illustrates a representation of one or more new aerial images accessed in accordance with one or more embodiments.

As discussed above, the georeferencing system 100 can also generate georeference information for a set of images that do not show known ground control points. FIG. 3D illustrates a representation of a second plurality of images 330 captured in accordance with one or more embodiments disclosed herein. The second plurality of images 330 depicts the same site as the plurality of images 300. However, in this particular embodiment, the georeferencing system 100 captures the second plurality of images 330 days after the plurality of images 300, and after changes to ground conditions have occurred. In particular, the second plurality of images 330 reflect a new structure 332, a structural addition 334 (i.e., an addition to the second structure 304); and an additional road 336 (i.e., an addition to road 306).

In other embodiments, the georeferencing system 100 can capture the second plurality of images 330 at a variety of points in time. For instance, the georeferencing system 100 can capture the second plurality of images 330 before the plurality of images 300. In particular, the georeferencing system 100 can capture the second plurality of images 330 within hours, days, minutes, weeks, months, or years of the plurality of images 300.

Similarly, georeferencing system 100 may capture individual images within the second plurality of images 330 at a variety of times. With regard to FIG. 3D, the georeferencing system 100 captures the second plurality of images 330 during the same flight of a UAV. In other embodiments, however, the georeferencing system 100 may capture individual images of the second plurality of images 330 on different days. For example, to provide greater detail with regard to a particular feature, the georeferencing system 100 may utilize images showing the particular feature (unchanged) captured on different days.

Notably, the second plurality of images 330 does not show the ground control points 308*a*-308*d*. As described above, the georeferencing system 100 can generate georeference information related to a set of images that does not include known ground control points based on a previous set of images that does include known ground control points. Specifically, and as discussed in more detail below, in one or more embodiments the georeferencing system 100 generates a new point cloud utilizing both the plurality of images 300 and the second plurality of images 330. In this manner, the georeferencing system 302 preserves much of the structure of point cloud 310, but incorporates new features of the second plurality of images 330. The georeferencing system 100 applies the transformation 320 (e.g., the transformation previously calculated with regard to point cloud 310) to the new point cloud. By applying the transformation 320 to the new point cloud, the georeferencing system 100 creates a new georeferenced point cloud that incorporates features from the second plurality of images (even though the second plurality of images did not show ground control points).

Figure 3E:
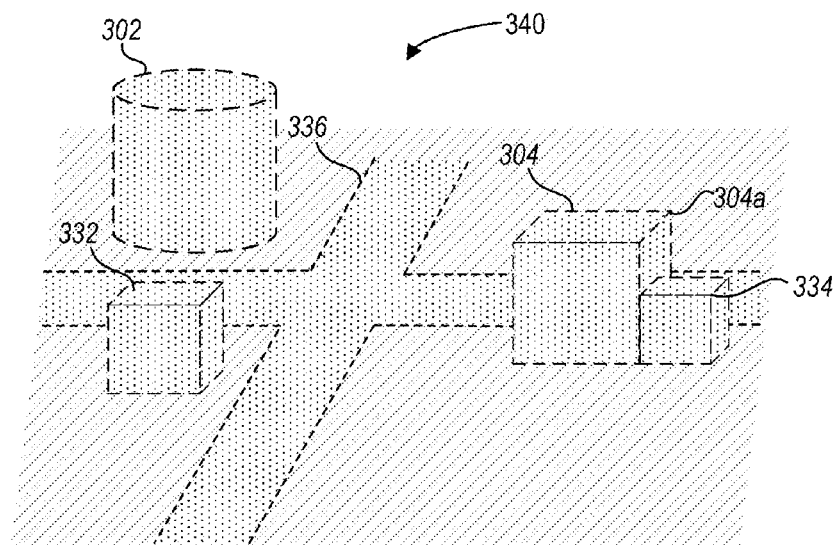
FIG. 3E illustrates a representation of a new unreferenced three-dimensional representation generated in accordance with one or more embodiments.

Indeed, to that end FIG. 3E illustrates a representation of a point cloud 340 generated based on the plurality of images 300 and the second plurality of images 330. In particular, FIG. 3E illustrates representations of data points corresponding to the first structure 302, the second structure 304, the new structure 332, the structural addition 334, and the additional road 336.

With regard to FIG. 3E, the georeferencing system 100 generates the point cloud 340 by comparing the plurality of images 300 and the second plurality of images 330. In particular, the georeferencing system 100 identifies features in the plurality of images 300 and the second plurality of images 330 and determines features that match. As described above, in one or more embodiments the georeferencing system 100 generates a three-dimensional point cloud based on the matched features. For example, the georeferencing system 100 can calculate feature trajectories and utilize the feature trajectories to construct three-dimensional position of matching features. In particular, one or more embodiments of the georeferencing system 100 utilize a structure from motion algorithm to generate the three-dimensional point cloud.

In one or more embodiments, the georeferencing system 100 utilizes an incremental bundle adjustment algorithm (as discussed above), adding the second plurality of images 330 to the plurality of images 300 in the bundle adjustment. For instance, by adding the second plurality of images 330 to the plurality of images 300, the georeferencing system 100 can grow the reconstruction of the two-dimensional images to the three-dimensional point cloud. Thus, the second plurality of images 330 projects onto the three-dimensional structure (i.e., point cloud) established by the plurality of images 300. That said, because the georeferencing system 100 captures the plurality of images 300 and the second plurality of images 330 at different times (e.g., on different days), the georeferencing system 100 utilizes a filter to ensure proper feature matching.

To produce a point cloud reflecting changes in ground condition over time, the georeferencing system 100 can prioritize one or more features. In particular, with regard to FIG. 3E, the georeferencing system 100 prioritizes the features of the second plurality of images 330 to reflect the new features in the second plurality of images 330 in the point cloud 340. For example, the new structure 332 did not appear in the plurality of images 300. The georeferencing system 100 prioritizes the features of the second plurality of images 330 so that data points relating to the new structure 332 appear in the point cloud 340. Similarly, the georeferencing system 100 prioritizes the features of the second plurality of images 330 so that data points relating to the structural addition 334 and the additional road 336 (i.e., modifications to an existing structure or feature) are reflected in the point cloud 340.

In one or more embodiments, the georeferencing system 100 can prioritize particular features from one or more particular images (or sets of images). For example, in one or more embodiments, the georeferencing system 100 can prioritize ground control points so that the ground control points 308a-308d appear in the point cloud 340. It is not necessary, however, to operation of the georeferencing system 100 to ensure that data points corresponding to the ground control points 308a-308d appear in the point cloud 340. Thus, in the embodiment illustrated in FIG. 3E, the georeferencing system 100 generates the point cloud 340 without data points corresponding to known ground control points.

In producing the point cloud 340 from the plurality of images 300 and the second plurality of images 330, the georeferencing system 100 may preserve coordinates relative to the point cloud 310. For instance, as described above, the corner 304a of the second structure 304 is located at coordinate (7, 3, 0) with regard to the point cloud 310 (prior to applying the transformation 320). With regard to FIG. E, after generating the point cloud 340 from the plurality of images 300 and the second plurality of images 330, the unchanged corner 304a of the second structure 304 is still located at coordinate (7, 3, 0) in the point cloud 340. In other words, the georeferencing system 100 can utilize the bundle adjustment to align the second plurality of images 330 to the structures of the point cloud 310.

Figure 3F:
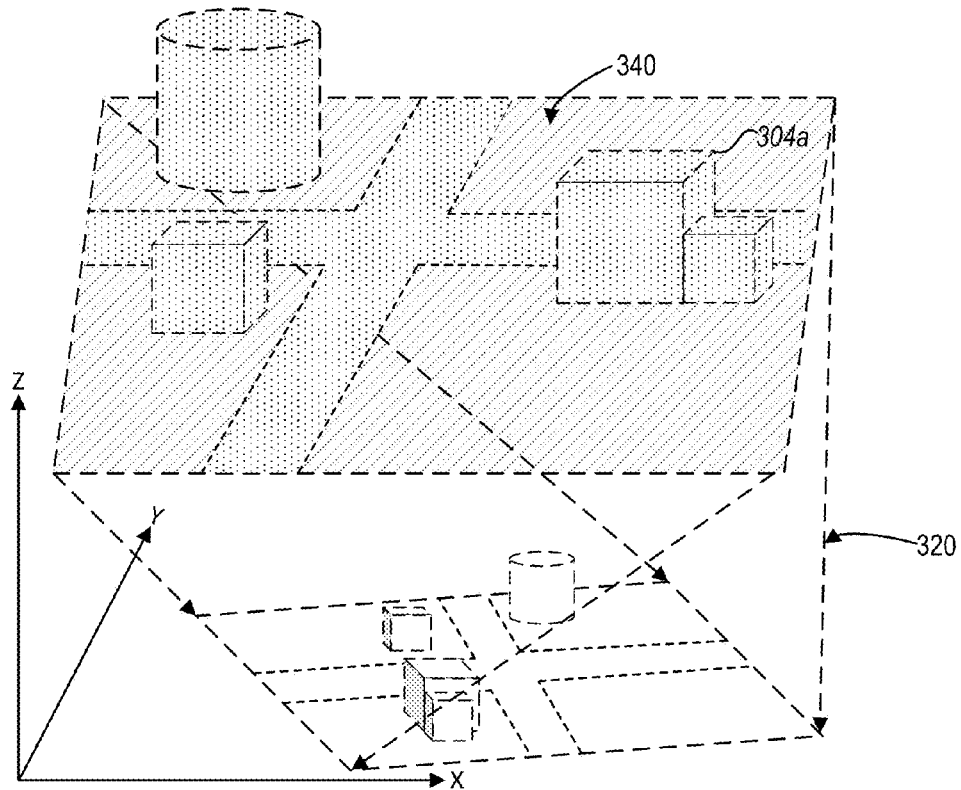
FIG. 3F illustrates a representation of the transformation of FIG. 3C applied to the new unreferenced three-dimensional representation of FIG. 3E in accordance with one or more embodiments.

As discussed previously, the georeferencing system 100 may apply a previously calculated transformation to a new point cloud. FIG. 3F illustrates application of the transformation 320 to the point cloud 340. The georeferencing system 100 applies the transformation 320 to modify (i.e., rotate, translate, and scale), the point cloud 340. In particular, the georeferencing system 100 applies the transformation 320 so that the data points in the point cloud 340 relate to corresponding geographic coordinates (e.g., to corresponding locations on Earth).

For example, as discussed previously with regard to FIG. 3C, after application of the transformation 320 to the point cloud 310, a data point corresponding to the corner 304a of the second structure 304 was located at point (1007, 3003, 10) relative to a section corner on the Earth. Upon application of the transformation 320 to the point cloud 340, a data point corresponding to the corner 304a of the second structure 304 is also located at point (1007, 3003, 10) relative to the section corner on the Earth. However, data points corresponding to new or modified features are now located with regard to new or modified real world coordinates. For example, if corner 304a of the second structure 304 shifted to a modified location due to settlement as reflected in the second plurality of images 330 and the point cloud 340, the application of the transformation 320 to the point cloud 340 will produce a data point located at the modified location— e.g., (1007, 3003, 9). The georeferencing system 100 can produce this georeference information, even though the second plurality of images 330 showed no ground control points.

Although FIGS. 3A-3F illustrate the plurality of images 300 showing ground control points, and generating a georeferenced point cloud utilizing ground control points, as mentioned previously, in one or more embodiments, the georeferencing system 100 may capture a set of images with GPS data associated with the set of images. Moreover, in one or more embodiments, the georeferencing system 100 can utilize GPS data to generate a georeferenced point cloud. For example, in one or more embodiments, georeferencing system 100 may capture the plurality of images 300 with GPS data providing the location of a UAV at the time one or more of the plurality of images 300 were captured. The georeferencing system 100 can utilize GPS data to build a georeferenced point cloud.

In additional or alternative embodiments, however, the georeferencing system 100 may capture an image with GPS data, but not utilize the GPS data for generating georeference information. For example, in some circumstances (depending on features of a GPS system and other factors) ground control points may provide a more accurate reference and provide more accurate georeference information for a set of aerial images. Thus, in some embodiments the georeferencing system 100 may capture the plurality of images 300 showing the ground control points 308a-308d and also capture the plurality of images 300 with corresponding GPS data. In such circumstances, the georeferencing system 100 can utilize only the ground control points 308-308d, only the GPS data, or both to generate a georeferenced point cloud.

Similarly, in some circumstances the georeferencing system 100 may capture the second plurality of images 330 with GPS data, but without ground control points. In one or more embodiments, the georeferencing system 100 will generate georeference information for the second plurality of images 330 without utilizing the GPS data captured with the second plurality of images 330. Indeed, as mentioned, in some applications, such an approach can provide even more accurate georeference information than utilizing GPS data related to the second plurality of images 330 to generate georeference information. Regardless, ultimately the georeferencing system can generate georeference information with regard to the second plurality of images 330 utilizing georeference information related to the plurality of images 300.

As mentioned previously, in some circumstances the process of generating a point cloud from a plurality of images can result in drift. Specifically, iterative or sequential structure from motion processes can lead to accumulated inaccuracies in the point cloud. Accordingly, in one or more embodiments, the georeferencing system 100 controls for such inaccuracies. In particular, one or more embodiments of the georeferencing system 100 refines ground control points and utilizes an additional constrained bundle adjustment algorithm based on the refined ground control points to reduce drift.

More specifically, in one or more embodiments, the georeferencing system 100 can generate refined ground control points by comparing observed positions of ground control points to measured positions of the ground control points. In particular, the georeferencing system 100 can generate refined ground control points by filtering observed positions, generating a transformation between the observed positions and measured positions of the ground control points, and applying the transformation inversely to generate refined ground control points that reflect, within a local coordinate system, the relative orientation, alignment, and position of the measured positions of the ground control points.

Figure 4C:
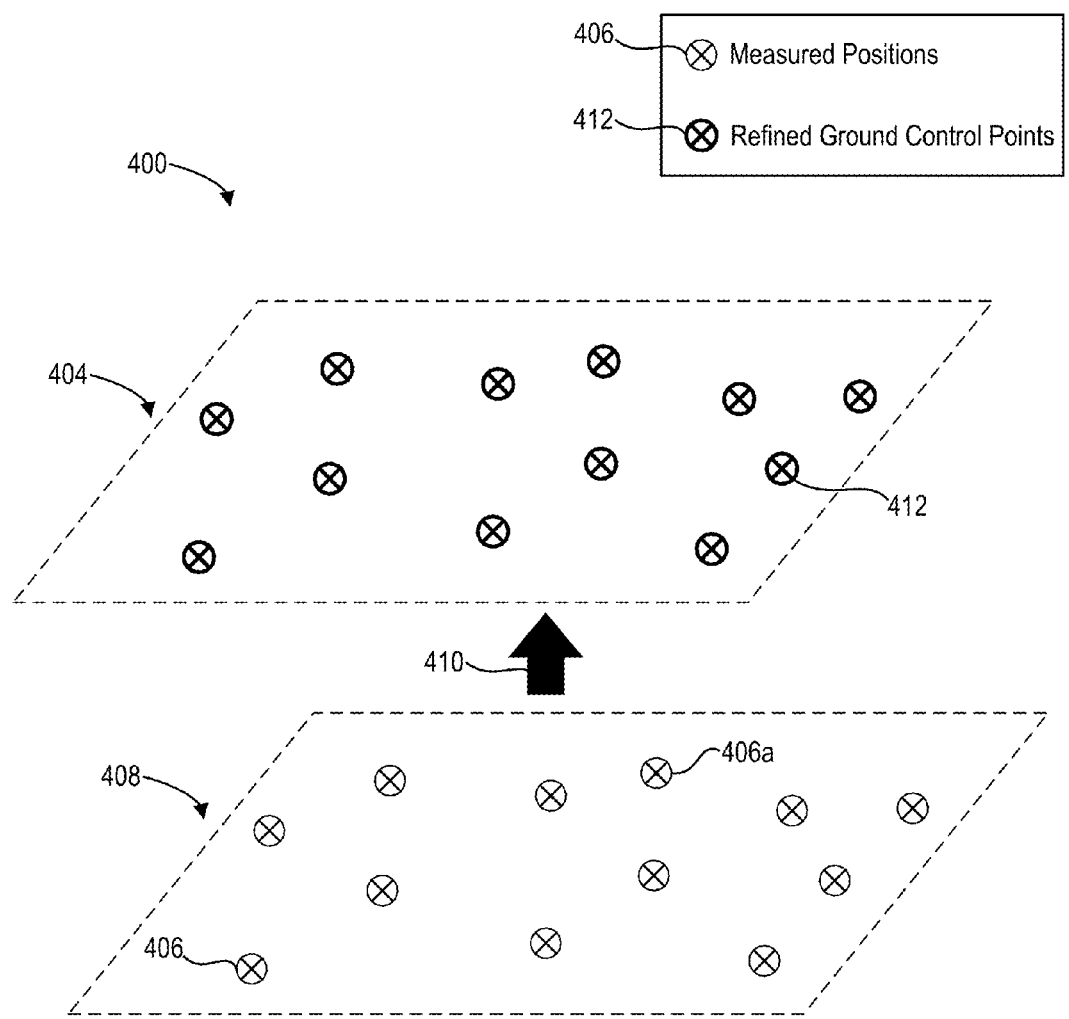
FIG. 4C illustrates applying a transformation inversely to measured positions of ground control points in accordance with one or more embodiments.

For example, FIGS. 4A-4C illustrate generating refined ground control points in accordance with one or more embodiments. In particular, FIG. 4A illustrates a point cloud 400 showing observed positions 402 of ground control points with regard to a point cloud reference system 404 (e.g., a relative coordinate system defining the location of the observed positions 402 within the point cloud). With regard to the embodiment of FIG. 4A, the observed positions 402 are points in a point cloud generated from a plurality of images showing ground control points. Because of drift, the observed positions 402 do not match measured positions of the ground control points. For instance, the relative location, alignment, and orientation of the observed positions 402 may differ from the measured positions of the ground control points.

As mentioned above, in one or more embodiments, the georeferencing system 100 filters the observed positions 402. For instance, in one or more embodiments the georeferencing system 100 applies a filter to identify outliers (and correspondingly, inliers) from the observed positions 402. Specifically, one or more embodiments of the georeferencing system 100 calculates error values associated with one or more of the observed positions 402 and compares the error values to a pre-determined threshold (e.g., identify outliers where the observed positions 402 correspond to error values greater than the pre-determined threshold).

For example, one or more embodiments of the georeferencing system 100 calculate an error value corresponding to one or more of the observed positions 402 by generating a transformation for one or more of the observed positions 402 with regard to measured positions of the ground control points. The georeferencing system 100 can compare the accuracy of the transformation applied to the observed positions 402 relative to the measured positions of the ground control points. For instance, the georeferencing system 100 can identify error values based on the difference between the measured position of the ground control points and the observed positions 402 after application of a transformation, according to the following:

$$E = T \times GCP_{Observed} - GCP_{Measured}$$

where E is the error value, T is the best fit transformation of the observed positions relative to the measured positions, $GCP_{Observed}$ is the observed position of ground control points, and $GCP_{Measured}$ is the measured position of the ground control points.

Moreover the georeferencing system 100 can identify inliers and/or outliers by comparing the error value to a threshold. For example, the georeferencing system 100 can identify outliers if the error value is greater than a pre-determined error threshold and identify inliers if the error value is less than a predetermined threshold. More specifically, one or more embodiments of the georeferencing system 100 utilize a RANSAC algorithm to identify outliers (and correspondingly inliers) in light of error values corresponding to one or more observed positions.

In one or more embodiments, the georeferencing system 100 can select a threshold (e.g., the pre-determined thresholds discussed above). For instance, in one or more embodiments, the georeferencing system 100 identifies a threshold based on user input. Similarly, in one or more embodiments, the georeferencing system 100 selects thresholds based on a characteristic of a plurality of images or a three-dimensional representation (e.g., a resolution or density of a three-dimensional point cloud). In other embodiments, the georeferencing system 100 can utilize other heuristics to select a threshold.

One or more embodiments of the georeferencing system 100 can also apply alternative or additional filters. For instance, in one or more embodiments the georeferencing system 100 filters the observed positions 402 that are based on an insufficient number of observations (e.g., an insufficient number of aerial images showing the ground control point). For instance, if the ground control point does not have enough observations or some of its observations are false positives (observations that do not correspond to the ground control point), one or more embodiments of the georeferencing system 100 filter the point in generating refined ground control points.

For example, FIG. 4B illustrates the point cloud 400 after application of a filter. In particular, FIG. 4B illustrates observed positions 402a-402n that satisfy application of the filter described above. Specifically, the observed positions 402a-402n reflect inliers from the observed positions 402 that individually stem from a sufficient number of aerial images.

To generate refined ground control points, one or more embodiments of the georeferencing system 100 calculate a transformation that best fits the observed positions 402a-402n. Specifically, with regard to FIG. 4B, the georeferencing system 100 identifies a transformation 410 that best fits the observed positions 402a-402n to measured positions 406 on real-world reference system 408. The measured positions 406 represent the measured positions of the ground control points corresponding to the observed positions 402 of the ground control points. Moreover, the real-world reference system 408 reflects a relative coordinate system utilized to describe the measured positions 406 of the ground control points. Thus, the transformation 410 converts the observed positions 402a-402n from the point cloud reference system 404 to the real-world reference system 408.

As illustrated in FIG. 4B the transformation 410 may not perfectly fit the observed positions 402a-402n to the corresponding measured positions 406. Indeed, drift may make a perfect transformation between the observed positions 402a-402n to the measured positions 406 unfeasible. Accordingly, in one or more embodiments, the transformation 410 represents a best fit transformation between the observed positions 402a-402n and the measured positions 406. Regardless, the transformation 410 assists in converting the observed positions to the real-world reference system 408.

The transformation 410 is not only useful in converting from the point cloud reference system 404 to the real-world reference system 408, the transformation can also be utilized to convert from the real-world reference system 408 to the point cloud reference system 404. Indeed, the georeferencing system 100 can utilize the transformation 410 inversely to convert the measured positions 406 from the real-world reference system 408 to the point cloud reference system 404. Converting points (e.g., measured positions of ground control points) from the real-world reference system 408 to the point cloud reference system 404 can assist in removing drift.

For example, as shown in FIG. 4C, the georeferencing system 100 utilizes the transformation 410 inversely. In particular, the georeferencing system 100 utilizes the transformation 410 inversely to translate the measured positions 406 to the point cloud reference system 404. In this manner, the georeferencing system 100 can generate refined ground control points 412. In particular, the refined ground control points 412 represent the measured positions 406 in the point cloud reference system 404. More specifically, the refined ground control points 412 preserve the relative orientation, alignment, and position of the measured positions 406 while converting the measured positions 406 to the point cloud reference system 404.

As illustrated in FIG. 4C, in one or more embodiments, the georeferencing system 100 can convert the measured positions 406 to the point cloud reference system 404 (e.g., utilizing the transformation 410) even if the measured positions 406 do not correspond to the filtered, observed positions 402a-402n (i.e., the inliers). For example, measured point 406a does not correspond to any of the observed positions 402a-402n. One or more embodiments of the georeferencing system 100 can apply the transformation 410 inversely to the measured point 406a to convert the measured point 406a to the point cloud reference system 404. In other words, the georeferencing system 100 can utilize the transformation 410 to convert any number of the measured points 406 (or other real-world points) to the point cloud reference system 404. In other embodiments, the georeferencing system 100 can utilize the transformation 410 to only convert the measured positions 406 that correspond to the observed positions 402a-402n (i.e., the inliers).

It will be appreciated that although the point cloud reference system 404 and the real-world reference system 408 are illustrated with regard to FIGS. 4A-4C as being similar in rotation, scale, and location, the point cloud reference system 404 and real-world reference system 408 can be differ in rotation (in any direction), scale (larger or smaller), and location (in any direction). Indeed, as discussed above, with regard to the transformation 320, the transformation 410 can rotate, scale, and translate points (including observed positions 402 and measured positions 406) between reference systems that are arranged at any orientation, scale, and translation.

Aside from calculating the refined ground control points 412, one or more embodiments of the georeferencing system 100 utilizes the refined ground control points 412 to address drift in a point cloud. In particular, in one or more embodiments the georeferencing system 100 utilizes the refined ground control points 412 as constraints (e.g., anchor points) in remedying errors in a point cloud. Specifically, the georeferencing system 100 can utilize the refined ground control points 412 as constraints in applying a constrained bundle adjustment algorithm.

As mentioned above, a bundle adjustment algorithm utilizes a plurality of images to refine three-dimensional points describing a site and parameters regarding camera intrinsics (e.g., optical characteristics) and camera extrinsics (e.g., camera position). In other words, a bundle adjustment algorithm is an optimization problem with regard to the three-dimensional structure of a site and parameters of a camera capturing a plurality of images of the site. Moreover, a constrained bundle adjustment algorithm is a bundle adjustment algorithm with applied limitations (e.g., limitations or constraints based on known information). For example, a constrained bundle adjustment algorithm can utilize given information (e.g., known camera parameters, known three-dimensional points, etc.) in optimizing remaining unknown three-dimensional structure points and/or camera parameters.

In one or more embodiments, the georeferencing system 100 utilizes a constrained bundle adjustment based on the refined ground control points 412. Specifically, in one or more embodiments, the georeferencing system 100 sets the refined ground control points 412 as constant constraints (e.g., defines the observed position of ground control points 406 based on the refined ground control points 412). With the refined ground control points 412 set as constant values, the georeferencing system 100 can apply a constrained bundle adjustment to the remainder of a point cloud corresponding to the ground control points. In this manner, the georeferencing system 100 can utilize the refined ground control points 412 to rectify accumulated errors in the point cloud (e.g., utilize the refined ground control points as anchors in a constrained bundle adjustment algorithm to correct drift).

In addition to setting the refined ground control points 412 as constant, the georeferencing system 100 can also utilize the refined ground control points 412 in a constrained bundle adjustment algorithm by weighting the ground control points. In particular, one or more embodiments of the georeferencing system 100 weigh the ground control points so that the bundle adjustment algorithm will emphasize errors associated with the refined ground control points 412 more heavily in optimizing the point cloud structure and camera parameters. Specifically, one or more embodiments of the georeferencing system 100 apply a scaling factor to the reprojection cost of the refined ground control points 412 in applying a constrained bundle adjustment algorithm.

For example, one or more embodiments of the georeferencing system 100 apply a constrained bundle adjustment that performs its optimization based on one or more cost functions. For instance, the bundle adjustment can utilize the cost function as a measure of the amount of error to optimize (e.g., minimize). Accordingly, one or more embodiments of the georeferencing system 100 utilize the following cost function with regard to a constrained bundle adjustment algorithm to weight the refined ground control points 412:

$$C=(s)[((K)[R|t](X))-x]$$

where C is the cost, s is the scaling factor, K is the camera intrinsics, [R|t] is the camera extrinsics, X is one or more three-dimensional points (e.g., one or more points from the point cloud, such as ground control points), and x is the two-dimensional observation of one or more three-dimensional points (e.g., an image of one or more points from a plurality of images).

Accordingly, one or more embodiments set X as constant (e.g., set the ground control points as constant based on the refined ground control points 412), apply a heightened scaling factor (e.g., a heightened scaling factor corresponding to the ground control points), and solve for the optimal solution of the remaining variables.

The georeferencing system 100 can come to the optimal solution utilizing a variety of tools or models. One or more embodiments of the georeferencing system 100 utilizes a non-linear least square solver (e.g., Ceres Solver). For example, the georeferencing system can add the point cloud and ground control points into the non-linear least square solver with the cost function C defined above and solve for the optimal solution. In this manner, the georeferencing system 100 can obtain a corrected point cloud.

Upon creation of an accurate georeferenced point cloud, the georeferencing system 100 can provide additional information to a user. For example, the georeferencing system 100 can provide, via a user interface, a representation or model of a georeferenced point cloud. Moreover, in one or more embodiments the georeferencing system 100 can generate an orthomap from a georeferenced point cloud.

Figure 5:
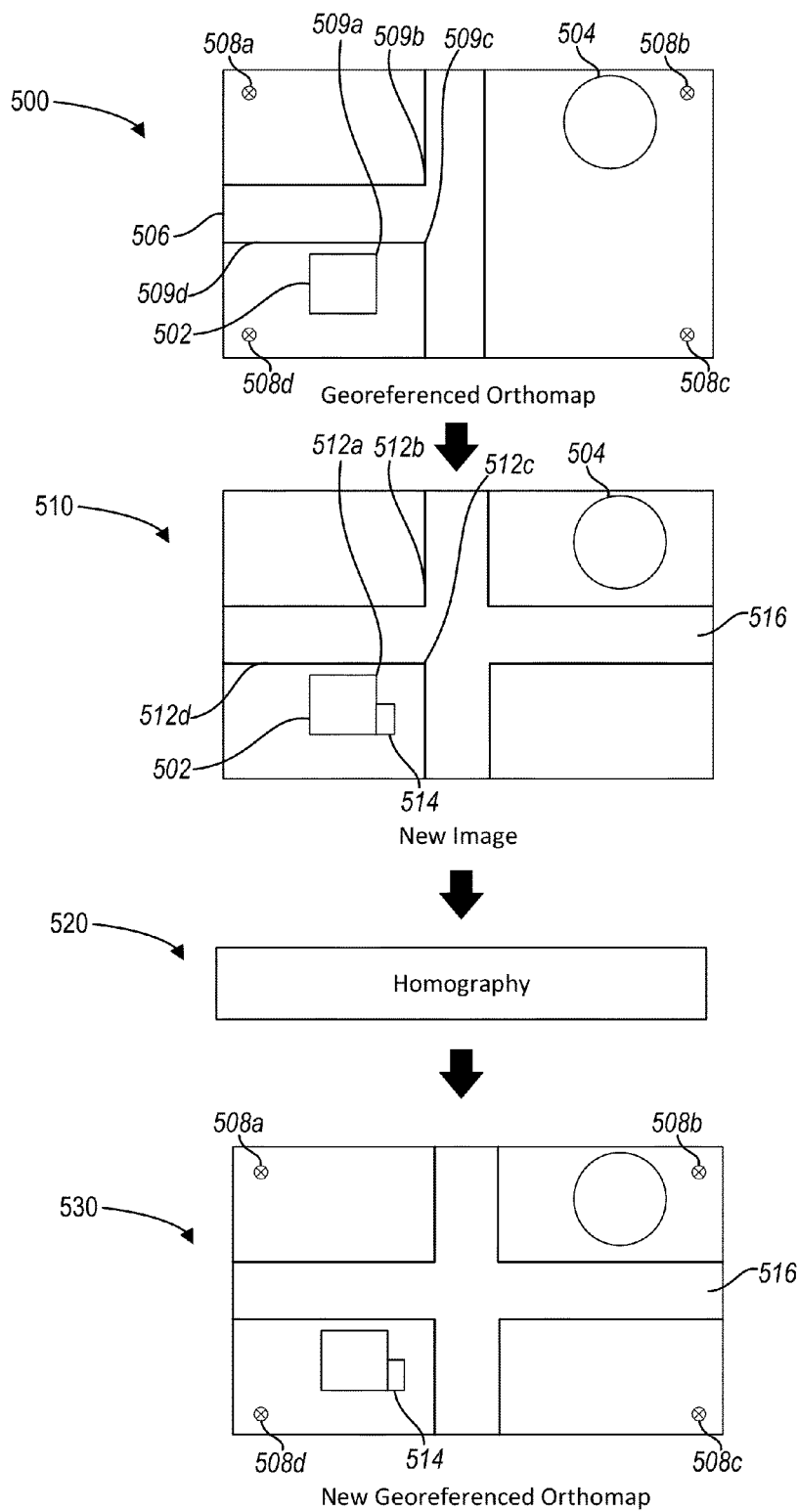
FIG. 5 illustrates a representation of generating georeference information for one or more new images in accordance with one or more embodiments.

Furthermore, the georeferencing system 100 can utilize an orthomap to further generate georeference information. In particular, FIG. 5 illustrates a representation of creating georeference information utilizing an existing georeferenced orthomap (e.g., a georeferenced orthomap created from existing images, as just described). For example, FIG. 5 illustrates a georeferenced orthomap 500, portraying a first structure 502, a second structure 504, and ground control points 508a-508d.

Moreover, FIG. 5 illustrates a new image 510. In one or more embodiments the new image 510 is an image that can be approximated to a plane and utilized with a homography. The new image 510 shows the same location portrayed in the georeferenced orthomap 500, albeit at a later point in time and after modifications to ground conditions. In particular, the new image 510 portrays a structural modification 514 and a new road 516 not shown in the georeferenced orthomap 500. Moreover, the new image 510 does not show ground control points. Accordingly, the new image 510 is an unreferenced aerial image.

The georeferencing system 100 can generate a new georeferenced orthomap containing features of the new image 510 from the georeferenced orthomap 500 and the new image 510. In particular, the georeferencing system 100 can detect and compare features from the georeferenced orthomap 500 and the new image 510. Moreover, the georeferencing system 100 can identify one or more matching features from the georeferenced orthomap 500 and the new image 510. Thus, with regard to FIG. 5, the georeferencing system 100 can identify features 509a-509d from the georeferenced orthomap 500 that respectively match features 512a-512d from new image 510.

As discussed earlier, the georeferencing system 100 can generate a homography, such as homography 520, illustrated in FIG. 5. In particular, with regard to FIG. 5, the georeferencing system generates the homography 520 based on, at least, the matched features 509a-509d and 512a-512d. Based on the matched features, the homography 520 enables the georeferencing system 100 to map features from the new image 510 to the georeferenced orthomap 500.

As discussed above, the georeferencing system 100 can prioritize one or more features. Accordingly, the georeferencing system 100 can prioritize the features of new image 510. For example, FIG. 5 illustrates a new georeferenced orthomap 530 generated using the homography 520 (based on the georeferenced orthomap 500 and the new image 510). As illustrated, the new georeferenced orthomap 530 displays the structural modification 514 shown in the new image 510 and the new road 516 shown in the new image 510. The new georeferenced orthomap 530 permits a user to measure precise distances and locations from the ground control points 508a-508d with regard to features and modifications shown in the new image 510, despite the fact that the new image 510 does not show ground control points.

Moreover, as shown, the georeferencing system 100 converts features from the new image 510 to a new georeferenced orthomap 530. After mapping features of the new image 510 utilizing the homography 520 and the georeferenced orthomap 500, the new georeferenced orthomap 530 includes the features of the new image 510.

Figure 6:
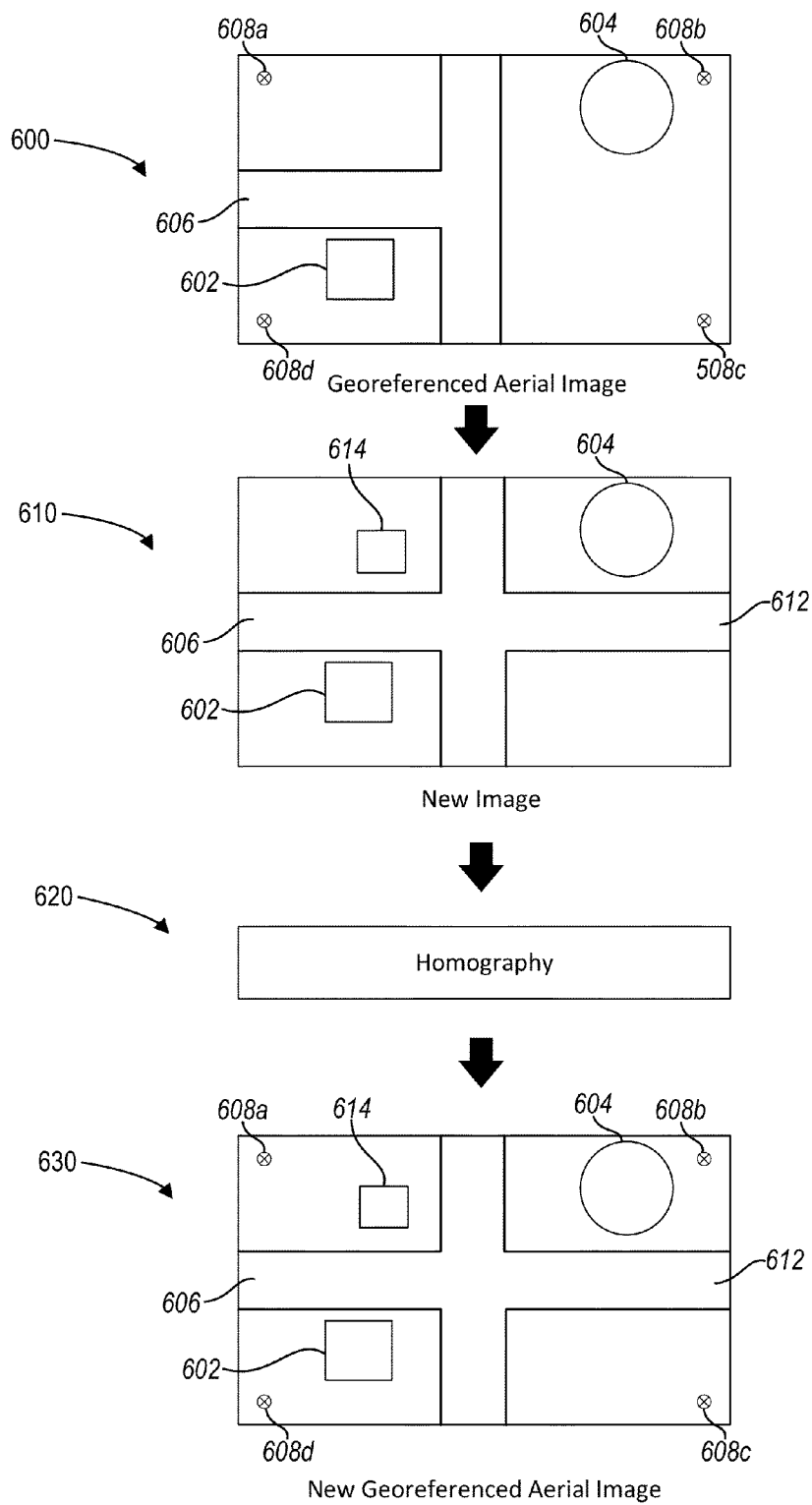
FIG. 6 illustrates another representation of generating georeference information for one or more new images in accordance with one or more embodiments.

The georeferencing system 100 can also generate georeference information without a georeferenced orthomap. FIG. 6 illustrates a representation of generating georeference information from a georeferenced aerial image in accordance with one or more embodiments. In particular, FIG. 6 illustrates a georeferenced aerial image 600, showing a first structure 602, a second structure 604, a road 606, and ground control points 608a-608d. In one or more embodiments georeferenced aerial image 600 comprises a plurality of aerial images. Not all of the images in the georeferenced aerial image 600 need show all the ground control points 608a-608d, the first structure 602, the second structure 604, and the road 606; to the contrary, each image may only show a portion of a site. For example, each image of the georeferenced aerial image 600 may show a single ground control point. In one or more embodiments, the georeferenced aerial image 600 comprises one or more images that can be approximated to a plane for utilization with a homography, as discussed below.

FIG. 6 also illustrates a new image 610. As shown, the new image 610 does not show ground control points, but does show a new road 612 and a new structure 614. In one or more embodiments, the new image 610 can comprise a plurality of aerial images. Each image in the plurality of aerial images from the new image 610 may show only a portion of a site; for example, one image may only show the first structure 602 and another image may only show the new road 612 (or some other portion). Moreover, in one or more embodiments, the georeferenced aerial image 600 comprises one or more images that can be approximated to a plan for utilization in conjunction with a homography.

The georeferencing system 100 detects features from a georeferenced aerial image 600 and the new image 610. The georeferencing system 100 compares detected features and identifies features common to the georeferenced aerial image 600 and the new image 610. In one or more embodiments, the georeferencing system 100 can identify one or more common features or one or more new features based on user input. For example, the georeferencing system 100 can receive user input identifying the first structure 602 as a common feature between the georeferenced aerial image 600 and new image 610. Additionally or alternatively, the georeferencing system 100 can autonomously identify common features.

As discussed previously, the georeferencing system 100 can utilize a homography 620 to generate georeference information. In particular, based on common features of the georeferenced aerial image 600 and the new image 610 the georeferencing system 100 can utilize the homography 620 to generate georeference information for a new georeferenced aerial image 630. As discussed previously, in one or more embodiments, the georeferencing system 100 estimates a homography robustly between the two images to account for variations. The georeferencing system 100 can utilize the homography 620 to generate georeference information with regard to the new image 610.

For example, with regard to FIG. 6, the georeferencing system 100 detects coordinates associated with the ground control points 608a-608d. The georeferencing system 100 utilizes the homography 620 to compute the position of the ground control points 608a-608d with regard to new image 610. Thus, the georeferencing system 100 can generate the new georeferenced aerial image 630 containing the ground control points 608a-608d.

In one or more embodiments, the georeferencing system 100 projects only the ground points 608a-608d onto the new image 610 to produce the new georeferenced aerial image 630. In other embodiments, the georeferencing system 100 projects other points onto the new image 610 to produce the new georeferenced aerial image 630. In other embodiments, the georeferencing system 100 projects points from the new image 610 to the georeferenced aerial image 600 to produce the new georeferenced aerial image 630. Regardless, at bottom the georeferencing system 100 can utilize a homography to produce georeferenced aerial image containing features of an aerial image captured without georeference information.

Although the exemplary embodiments illustrated and discussed with regard to FIGS. 3A-6 have illustrated a certain number of ground control points, it will be appreciated that the number of ground control points may vary. For example, in one or more embodiments, images may contain greater or fewer ground control points than illustrated. Similarly, with regard to embodiments utilizing a plurality of images to generate georeference information, some of the individual images in the plurality of images may not show ground control points.

In some circumstances a minimum number of ground control points may be needed to perform the functions of the georeferencing system 100. For example, as discussed, the georeferencing system 100 can utilize a first aerial image with ground control points to generate georeference information for a second aerial image captured without ground control points. In such circumstances, one or more embodiments of the georeferencing system 100 utilize at least three ground control points to generate the new georeferenced aerial image.

Figure 7:
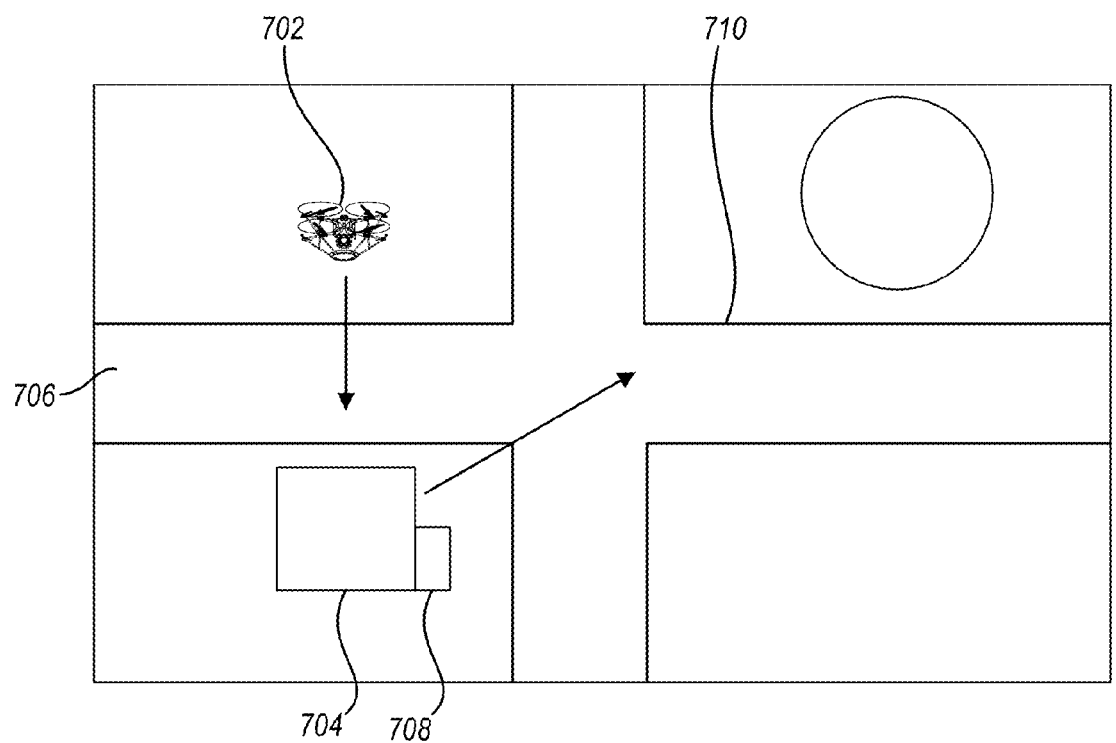
FIG. 7 illustrates a representation of a UAV navigating based on georeference information generated in accordance with one or more embodiments.

As mentioned previously, in one or more embodiments, the georeferencing system 100 utilizes georeference information for navigation. FIG. 7 illustrates a representation of utilizing georeference information for navigation in accordance with one or more embodiments. FIG. 7 illustrates a UAV 702 in flight over a site containing a structure 704, a road 706, a structural modification 708, and a new road 710. The UAV 702 includes an onboard digital camera capable of capturing digital aerial images during flight.

In the embodiment illustrated in FIG. 7, the georeferencing system 100 accesses an existing georeferenced orthomap for utilization during flight. Moreover, the UAV 702 captures a new aerial image of the site during flight. The georeferencing system 100 then utilizes the existing georeferenced orthomap and the new aerial image to generate a new georeferenced orthomap reflecting features of the new aerial image (as described above). The UAV 702 can then navigate in flight utilizing the new georeferenced orthomap.

For example, based on the new georeferenced orthomap, the UAV 702 can determine the location of the UAV 702 in relation to the Earth. Similarly, the UAV 702 can determine the location of one or more objects utilizing the new georeferenced orthomap. For example, the UAV 702 can determine the location of the structure 704 utilizing the new georeferenced orthomap, and navigate to the location of the structure 704 based on the new georeferenced orthomap.

In one or more embodiments, all or part of the georeferencing system 100 can be implemented as part of a computer system aboard the UAV 702. Thus, in one or more embodiments, the georeferencing system 100 can load an existing georeferenced orthomap on a computer system aboard the UAV 702. Moreover, in one or more embodiments of the georeferencing system 100, a camera operatively coupled to the UAV 702 captures a new image, a computer system aboard the UAV 702 generates a new georeferenced orthomap, and the computer system aboard the UAV 702 navigates the UAV 702 based on the new georeferenced orthomap. In other embodiments, portions of the georeferencing system 100 are implemented as part of the UAV 702 and other portions are implemented via other components (e.g., a ground station or a server) as described above with regard to FIG. 2.

The georeferencing system 100 can navigate based on detected location information, features, objects, similarities, differences, changes, modifications, or other information. For instance, in one or more embodiments, the georeferencing system 100 navigates based on differences between an existing georeferenced orthomap and one or more new images (or the difference between an existing georeferenced orthomap and a new georeferenced orthomap). As illustrated in FIG. 7, the UAV 702 detects the structural modification 708, and navigates based on the detected modification (e.g., navigates toward the structural modification 708 to take additional aerial images). Similarly, the UAV 702 detects the new road 710 not previously present in an existing georeferenced orthomap and navigates based on the detected modification.

In other embodiments, the georeferencing system 100 can provide a new georeferenced orthomap (generated based on a new image captured in flight) to one or more individuals navigating the UAV 702. For example, the georeferencing system 100 can provide for display, via a display device, a new georeferenced orthomap to an individual to allow the individual to more accurately navigate the UAV 702. For instance, the georeferencing system 100 can provide a user interface displaying a georeferenced orthomap (generated based on a new image captured in flight) with an indication of the location of the UAV 702, so that an individual navigating the UAV 702 can determine the precise location of the UAV 702 and navigate the UAV 702 accordingly.

For example, an individual navigating the UAV 702 from the ground may believe that the UAV 702 is flying (and capturing images) directly above the structure 704. A new georeferenced orthomap generated by the georeferencing system 100 may reveal that the UAV 702 is not directly over the structure 704 and allow the individual navigating the UAV 702 to modify the location of the UAV 702 accordingly.

Figure 8A:
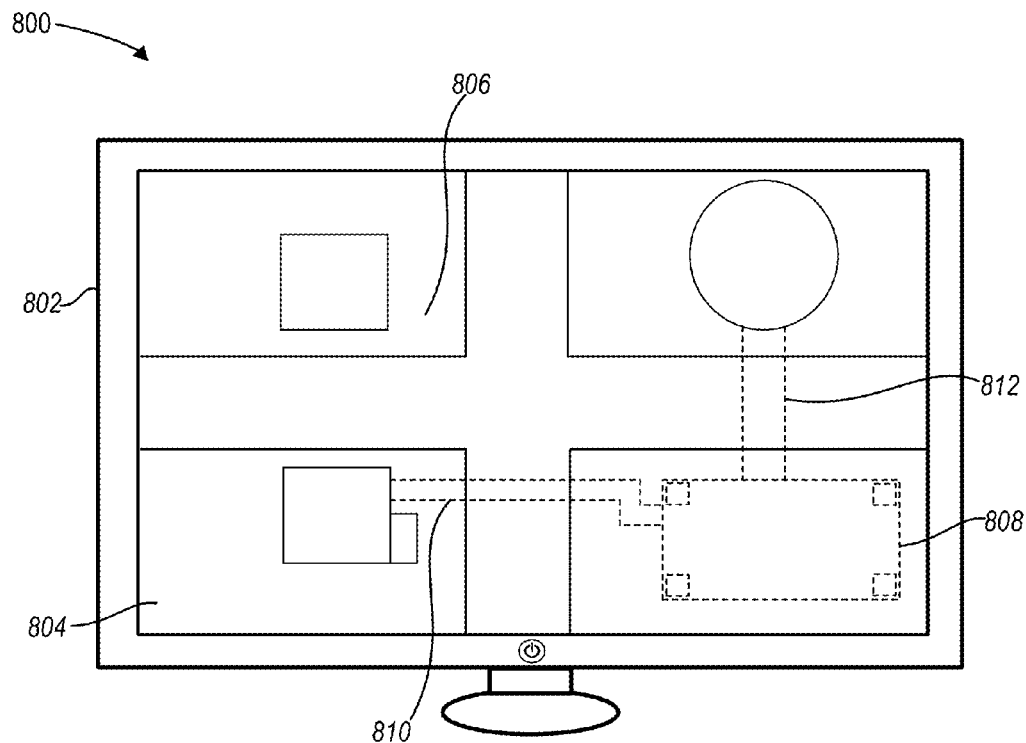
FIG. 8A illustrates a representation of a georeferenced orthomap and design elements in accordance with one or more embodiments.

The georeferencing system 100 can also utilize generated georeference information with regard to design. FIG. 8A illustrates a computer system 800 including a display device 802 with a display area 804. As illustrated, the display area 804 shows a georeferenced orthomap 706 (represented by solid lines) and proposed design elements (represented by dashed lines). In particular, the proposed design elements include a new structure 808, a utility addition 810, and a new waterline 812. Thus, the georeferencing system 100 can generate a georeferenced orthomap that provides to-scale measurements for utilization in engineering design.

Figure 8B:
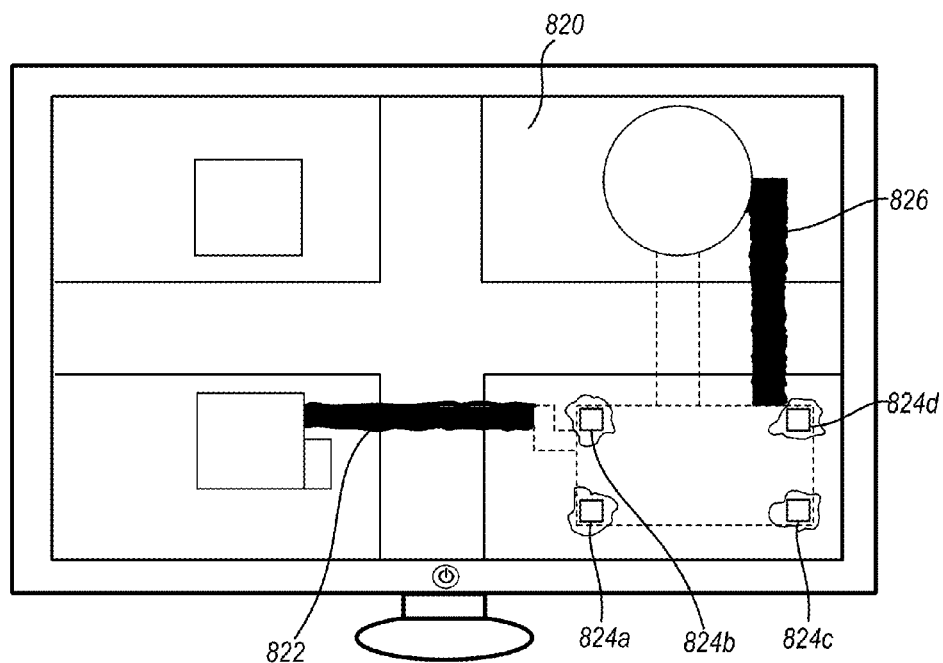
FIG. 8B illustrates a representation of a modified georeferenced orthomap and design elements in accordance with one or more embodiments.

As discussed, however, the georeferencing system 100 can also generate georeference information over time based on new images captured without georeference information and provide updated information for display to a user. FIG. 8B illustrates the computer system 800 displaying (via the display device 802) a new georeferenced orthomap 820 in conjunction with the design elements 708-712. In the embodiment illustrated in FIG. 8B, the georeferencing system 100 generates the new georeferenced orthomap 820 (i.e., generates georeference information) based on a plurality of new images captured without georeference information; then, utilizing the generated georeference information, provides the new georeferenced orthomap 820 in relation to the design elements 808-812.

By providing the new georeferenced orthomap 820 in conjunction with the design elements 808-812, the georeferencing system 100 permits a user to view the design in relation to up-to-date and accurate field information. For example, as illustrated in FIG. 8B, a user can see that a construction crew has opened a trench 822 for the utility addition 810, but has not completed the trench 822. Similarly, a user can see that footings 824a-824d have been constructed in the proper location, but that the remainder of the new structure 808 remains uncompleted. In addition, a user can see that a construction crew has opened a trench 826 that is not in alignment with the designed location for the new waterline 812. Accordingly, the user can make appropriate decisions based on the comparison (e.g., call the construction crew to determine the reason for the change in alignment).

The user can also make design changes, additions, or revisions based on the georeference information generated by the georeferencing system 100. For example, based on the location of the trench 826, an engineer can design a revised waterline.

Although FIGS. 8A, 8B illustrate providing georeferenced orthomaps via a display device, it will be appreciated that the georeferencing system 100 can provide a variety of images, information, reports, or summaries to a user in a variety of forms. For example, the georeferencing system 100 can generate engineering plans, as-built plans, models, three-dimensional representations, tables, or other information to a user. Thus, georeference information generated by the georeferencing system 100 can provide for display information that permits a user to make design or policy decisions regarding issues related to navigating the site, modifying the site, building a structure at the site, or any other issues.

Figure 9:
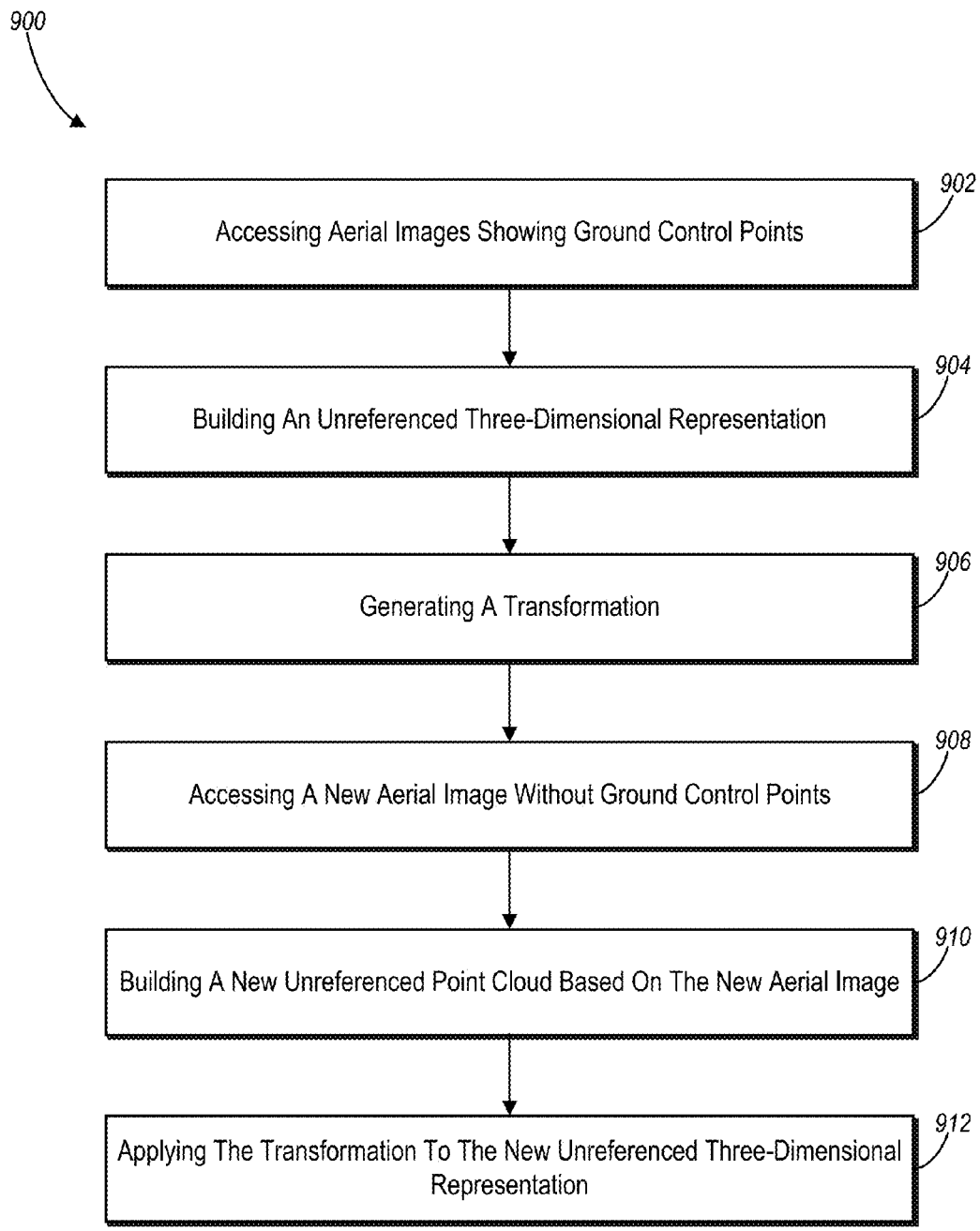
FIG. 9 illustrates a flowchart of a series of acts in a method of creating georeference information in accordance with one or more embodiments.
Figure 10:
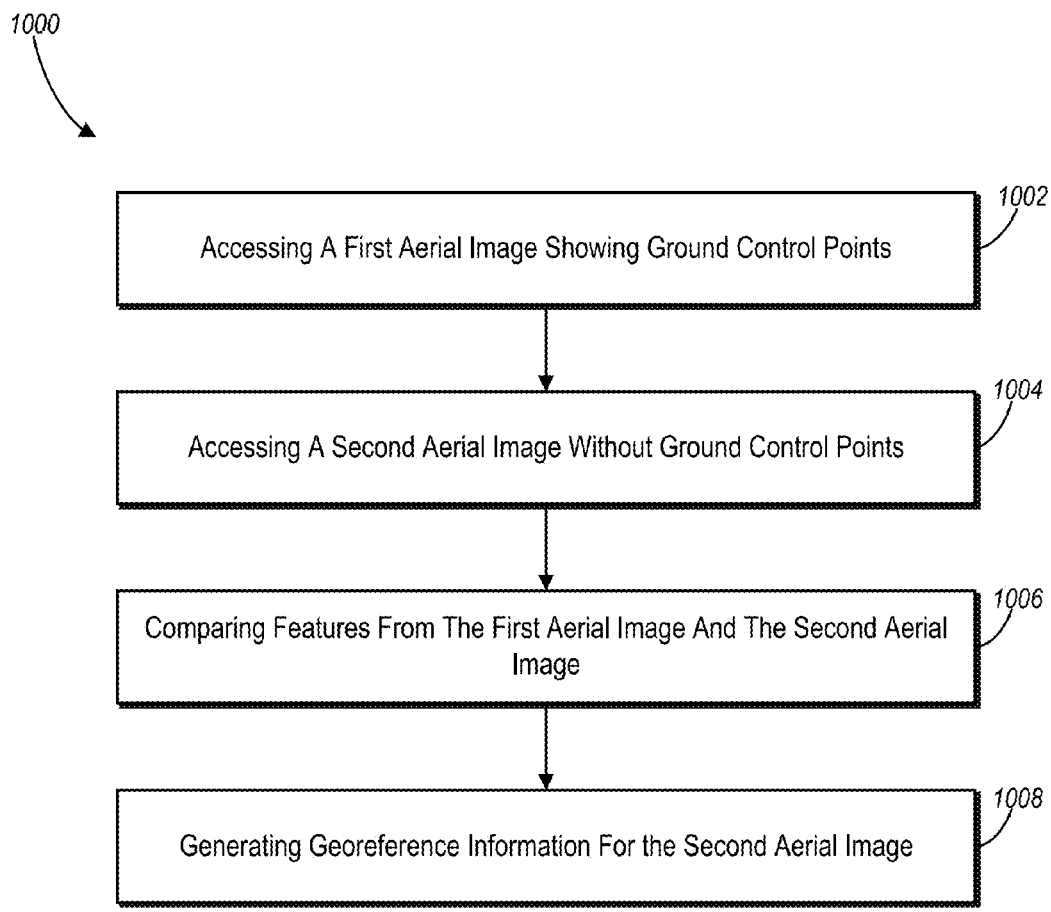
FIG. 10 illustrates another flowchart of a series of acts in a method of creating georeference information in accordance with one or more embodiments.

FIGS. 1-8, the corresponding text, and the examples, provide a number of different systems and devices for generating georeference information. In addition to the foregoing, one or more embodiments can also be described in terms of flowcharts comprising acts and steps in a method for accomplishing a particular result. For example, FIGS. 9 and 10 illustrate flowcharts of exemplary methods in accordance with one or more embodiments. The methods described in relation to FIGS. 9 and 10 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart of one example method 900 of generating georeference information in accordance with one or more embodiments. As illustrated, the method 900 may include the act 902 of accessing aerial images showing ground control points. In particular, the act 902 may include accessing a first plurality of aerial images showing a site, the first plurality of aerial images showing a plurality of known ground control points. For example, in one or more embodiments the known ground control points may comprise temporary markers placed at determined locations.

As shown in FIG. 9, the method 900 may also include an act 904 of building an unreferenced three-dimensional representation. In particular, the act 904 may include building an unreferenced three-dimensional representation from a first plurality of aerial images. For instance, the act 904 may include utilizing a structure from motion algorithm and a bundle adjustment algorithm to convert the first plurality of aerial images into an unreferenced three-dimensional representation representative of the site.

The act 904 may also include generating a plurality of refined ground control points based on observed positions of the plurality of ground control points in the plurality of aerial images and measured positions of the plurality of ground control points, and applying a constrained bundle adjustment algorithm to the initial three-dimensional representation utilizing the refined ground control points, wherein the constrained bundle adjustment algorithm weights the refined ground control points. Moreover, the act 904 may also include filtering the observed positions of the plurality of ground control points based on the measured positions of the plurality of ground control points; generating a transformation based on the filtered, observed positions and the corresponding measured positions; and applying the transformation inversely to the measured ground control points to generate refined ground control points Furthermore, as illustrated in FIG. 9, the method 900 may include an act 906 of generating a transformation. In particular, the act 906 may include generating, by at least one processor, a transformation based on the unreferenced three-dimensional representation and the plurality of known ground control points. For example, the act 906 may include generating a transformation by utilizing a Helmert transformation algorithm.

In addition, as shown in FIG. 9, the method 900 may include an act 908 of accessing a new aerial image without ground control points. In particular, the act 908 may include accessing at least one new aerial image showing the site, wherein the plurality of known ground control points are not shown within the at least one new aerial image. The new aerial image may be captured at a different time than the aerial images showing ground control points. For example, in one or more embodiments, the first plurality of aerial images are captured on a first day and the at least one new aerial image is captured on a day subsequent to the first day.

As illustrated in FIG. 9, the method 900 may also include an act 910 of building a new unreferenced three-dimensional representation based on the new aerial image. In particular, the act 910 may include building, by at least one processor, a new unreferenced three-dimensional representation based, at least in part, on at least one new aerial image. For example, the act 910 may include utilizing a structure from motion algorithm and a bundle adjustment algorithm to convert the at least one new image into a new unreferenced three-dimensional representation representative of the site. Similarly, the act 910 may also include identifying one or more common features between the first plurality of aerial images and the at least one new aerial image and generating a new unreferenced three-dimensional representation based on the common features. Furthermore, the act 910 may comprise prioritizing feature from the at least one new aerial image such that a new unreferenced three-dimensional representation reflects at least one feature from the at least one new aerial image not reflected in the unreferenced three-dimensional representation.

Moreover, as shown in FIG. 9, the method 900 may also include the act 912 of applying the transformation to the new unreferenced three-dimensional representation. In particular, the act 912 may include applying, by at least one processor, the transformation to the new unreferenced three-dimensional representation to create a new georeferenced three-dimensional representation. Furthermore, the act 912 may also include generating a georeferenced orthomap from the new georeferenced three-dimensional representation. Moreover, the act 912 may include, providing the georeferenced orthomap for utilization in at least one of navigating the site, modifying the site, modifying at least a portion of the site, or building a structure on at least a portion of the site.

FIG. 10 illustrates a flowchart of another example method 1000 of generating georeference information in accordance with one or more embodiments. As illustrated, the method 1000 includes an act 1002 of accessing a first aerial image showing ground control points. In particular, the act 1002 may include accessing at least one first aerial image showing a site, the at least one first aerial image showing a plurality of known ground control points. Moreover, the act 1002 may also include, accessing a georeferenced orthomap showing a site, wherein the georeferenced orthomap is based on at least one aerial image and a plurality of ground control points shown within the at least one aerial image.

As illustrated in FIG. 10, the method 1000 may also include an act 1004 of accessing a second aerial image without ground control points. In particular, the act 1004 may include accessing at least one second aerial image of the site, the at least one second aerial image not showing known ground control points. Similarly, the act 1004 may include accessing at least one new aerial image showing the site, wherein the plurality of ground control points are not shown within the at least one new aerial image. In one or more embodiments, the act 1004 includes capturing the at least one new aerial image using one or more cameras onboard a UAV during a flight.

Moreover, as shown in FIG. 10, the method 1000 may also include an act 1006 of comparing features from the first aerial image and the second aerial image. In particular, the act 1006 may include comparing, by at least one processor, one or more features from the at least one first aerial image with one or more features from the at least one second aerial image. For example, the act 1006 may include identifying common features between the at least one first aerial image and the at least one second aerial image based on the comparison between the one or more features from the at least one aerial image and the one or more features from the at least one second aerial image. The act 1006 may also include estimating a homography based on the identified common features.

Similarly, the act 1006 may include matching one or more features from the georeferenced orthomap with one or more features from the at least one new aerial image. For instance, the act 1006 may comprise detecting one or more features from the georeferenced orthomap; detecting one or more features from the at least one new aerial image, and comparing the one or more detected features from the georeferenced orthomap with the one or more detected features from the at least one new aerial image. Moreover, the act 1006 may include computing a homography relating the georeferenced orthomap and the at least one new aerial image, based on the one or more matched features from the georeferenced orthomap and the at least one new aerial image.

As illustrated in FIG. 10, the method 1000 may also include the act 1008 of generating georeference information for the second aerial image. In particular, the act 1008 may include generating, by the at least one processor and based on the comparison between the one or more features from the first plurality of aerial images and the one or more features from the at least one second aerial image, georeference information for the at least one second aerial image. For instance, the act 1006 may include identifying the location of at least one of the plurality of ground control points with regard to the at least one second aerial image. Similarly, the act 1008 may also include the act of updating, utilizing the homography, the georeferenced orthomap based on the at least one new aerial image.

The method 1000 may also include navigating a UAV during a flight based on an updated georeferenced orthomap. For instance, the act 1008 may include comparing the georeferenced orthomap and the updated georeferenced orthomap and navigating the UAV based on the comparison. Similarly, the act 1008 may include identifying a modification to the site based on the updated georeferenced orthomap and navigating the UAV based on the modification to the site.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
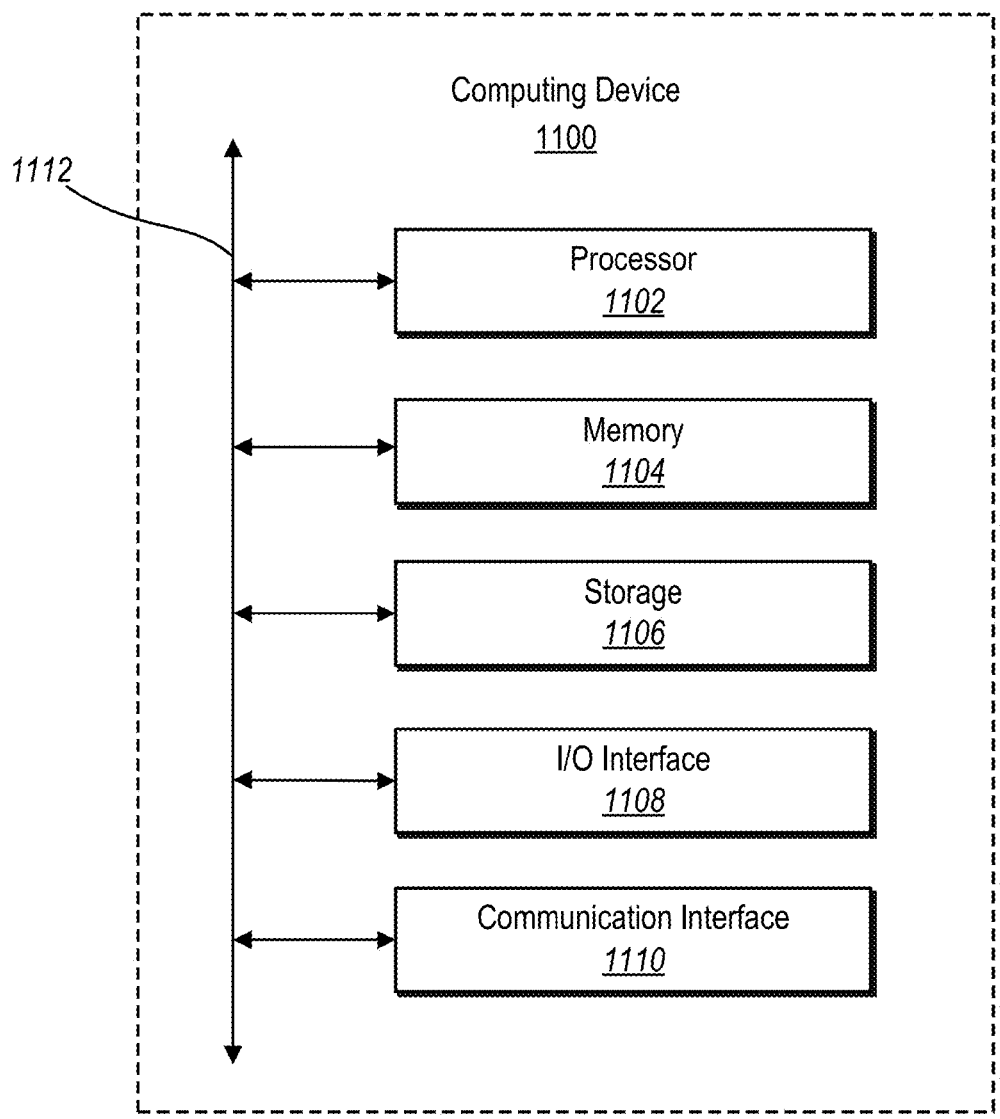
FIG. 11 illustrates a block diagram of an exemplary computing device in accordance with one or more embodiments.

FIG. 11 illustrates a block diagram of an exemplary computing device 1100 that may be configured to perform one or more of the processes described above. One will appreciate that the georeferencing system may be implemented by one or more computing devices such as the computing device 1100. As shown by FIG. 11, the computing device 1100 can comprise a processor 1102, memory 1104, a storage device 1106, an I/O interface 1108, and a communication interface 1110, which may be communicatively coupled by way of a communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, the computing device 1100 can include fewer components than those shown in FIG. 11. Components of the computing device 1100 shown in FIG. 11 will now be described in additional detail.

In particular embodiments, the processor 1102 includes hardware for executing instructions, such as those making up a computer program. As an example and not by way of limitation, to execute instructions, the processor 1102 may retrieve (or fetch) the instructions from an internal register, an internal cache, the memory 1104, or the storage device 1106 and decode and execute them. In particular embodiments, the processor 1102 may include one or more internal caches for data, instructions, or addresses. As an example and not by way of limitation, the processor 1102 may include one or more instruction caches, one or more data caches, and one or more translation lookaside buffers (TLBs). Instructions in the instruction caches may be copies of instructions in the memory 1104 or the storage 1106.

The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The storage device 1106 includes storage for storing data or instructions. As an example and not by way of limitation, the storage device 1106 can comprise a non-transitory storage medium described above. The storage device 1106 may include a hard disk drive (HDD), a floppy disk drive, flash memory, an optical disc, a magneto-optical disc, magnetic tape, or a Universal Serial Bus (USB) drive or a combination of two or more of these. The storage device 1106 may include removable or non-removable (or fixed) media, where appropriate. The storage device 1106 may be internal or external to the computing device 1100. In particular embodiments, the storage device 1106 is non-volatile, solid-state memory. In other embodiments, the storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1108 allows a user to provide input to, receive output from, and otherwise transfer data to and receive data from the computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1112 may include hardware, software, or both that couples components of the computing device 1100 to each other. As an example and not by way of limitation, the communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A computer-implemented method comprising:
   accessing a first plurality of aerial images showing a site with a plurality of known ground control points, the first plurality of aerial images showing the plurality of known ground control points;
   building an initial three-dimensional representation from the first plurality of aerial images showing the plurality of known ground control points, wherein the initial three-dimensional representation comprises data points;
   generating, using at least one processor, a transformation based on the initial three-dimensional representation and the plurality of known ground control points;
   accessing at least one new aerial image of the site without the plurality of known ground control points, wherein the plurality of known ground control points are not shown within the at least one new aerial image;
   building, by the at least one processor, a new unreferenced three-dimensional representation based, at least in part, on the at least one new aerial image of the site without the plurality of known ground control points; and
   applying, by the at least one processor, the transformation generated based on the initial three-dimensional representation and the plurality of known ground control points to the new unreferenced three-dimensional representation built based on the at least one new aerial image of the site without the plurality of known ground control points to create a new georeferenced three-dimensional representation, wherein the transformation defines rotation, scaling, and translation of the data points in the initial three-dimensional representation to geographic locations of the data points.

2. The method of claim 1, further comprising generating a georeferenced orthomap from the new georeferenced three-dimensional representation, wherein the georeferenced orthomap comprises a geometrically corrected aerial image of the site where tilt and relief have been corrected to portray a uniform scale.

3. The method of claim 1,
   wherein building the initial three-dimensional representation from the first plurality of aerial images comprises utilizing a structure from motion algorithm and a bundle adjustment algorithm to convert the first plurality of aerial images into the initial three-dimensional representation, and
   wherein building the new unreferenced three-dimensional representation based, at least in part, on the at least one new aerial image comprises utilizing the structure from motion algorithm and the bundle adjustment algorithm to convert the at least one new image into the new unreferenced three-dimensional representation.

4. The method of claim 1, wherein the first plurality of aerial images are captured at a first point in time when the site comprises the plurality of known ground control points and the at least one new aerial image is captured at a second point in time subsequent to the first point in time when the site does not comprise the known ground control points.

5. The method of claim 1, wherein building the new unreferenced three-dimensional representation further comprises:
   identifying one or more common features between the first plurality of aerial images and the at least one new aerial image; and
   generating the new unreferenced three-dimensional representation based on the one or more common features.

6. The method of claim 1, wherein building the new unreferenced three-dimensional representation further comprises prioritizing features from the at least one new aerial image such that the new unreferenced three-dimensional representation reflects at least one feature from the at least one new aerial image not reflected in the initial three-dimensional representation.

7. The method of claim 2, further comprising providing the georeferenced orthomap for utilization in at least one of navigating the site, modifying at least a portion of the site, or building a structure on at least a portion of the site.

8. The method of claim 1, further comprising generating refined ground control points based on observed positions of the plurality of known ground control points in the first plurality of aerial images by:
   filtering the observed positions of the plurality of known ground control points based on measured positions of the plurality of known ground control points;
   generating a transformation based on the filtered observed positions and corresponding measured positions; and
   applying the transformation inversely to the measured positions of the plurality of known ground control points to generate the refined ground control points.

9. The method of claim 8, further comprising utilizing the refined control points as anchors in a constrained bundle adjustment algorithm applied to the initial three-dimensional representation to correct drift errors in the initial three-dimensional representation.

10. A system comprising:
    at least one processor; and
    at least one non-transitory computer readable storage medium storing instructions that, when executed by the at least one processor, cause the system to:
    access a first plurality of aerial images of a site with a plurality of known ground control points, the first plurality of aerial images showing the plurality of known ground control points;
    build an initial three-dimensional representation from the first plurality of aerial images showing the plurality of known ground control points, wherein the initial three-dimensional representation comprises data points;
    generate a transformation based on the initial three-dimensional representation and the plurality of known ground control points;
    access at least one new aerial image of the site without the plurality of known ground control points, wherein the plurality of known ground control points are not shown within the at least one new aerial image;
    build a new unreferenced three-dimensional representation based, at least in part, on the at least one new aerial image without the plurality of known ground control points; and
    apply the transformation generated based on the initial three-dimensional representation and the plurality of known ground control points to the new unreferenced three-dimensional representation built based on the at least one new aerial image of the site without the plurality of known ground control points to create a new georeferenced three-dimensional representation, wherein the transformation defines rotation, scaling, and translation of the data points in the initial three-dimensional representation to geographic locations of the data points.

11. The system of claim 10, further comprising instructions that, when executed by the at least one processor, cause the system to generate a georeferenced orthomap from the new georeferenced three-dimensional representation, wherein the georeferenced orthomap comprises a geometrically corrected aerial image of the site where tilt and relief have been corrected to portray a uniform scale.

12. The system of claim 10, wherein building the new unreferenced three-dimensional representation further comprises:
identifying one or more common features between the first plurality of aerial images and the at least one new aerial image; and
generating the new unreferenced three-dimensional representation based on the common features.

13. The system of claim 10, wherein building the new unreferenced three-dimensional representation further comprises prioritizing features from the at least one new aerial image such that the new unreferenced three-dimensional representation reflects at least one feature from the at least one new aerial image not reflected in the initial three-dimensional representation.

14. The system of claim 11, further comprising instructions that, when executed by the at least one processor, cause the system to provide the georeferenced orthomap for utilization in at least one of navigating the site, modifying at least a portion of the site, or building a structure on at least a portion of the site.

15. The system of claim 10, further comprising instructions that, when executed by the at least one processor, cause the system to generate refined ground control points based on observed positions of the plurality of known ground control points in the first plurality of aerial images by:
filtering the observed positions of the plurality of known ground control points based on measured positions of the plurality of known ground control points;
generating a transformation based on the filtered observed positions and corresponding measured positions; and
applying the transformation inversely to the measured positions of the plurality of known ground control points to generate the refined ground control points.

16. The system of claim 15, further comprising instructions that, when executed by the at least one processor, cause the system to utilize the refined ground control points as anchors in a constrained bundle adjustment algorithm applied to the initial three-dimensional representation.

17. A non-transitory computer readable medium storing instructions thereon that, when executed by at least one processor, cause a computer system to:
access a first plurality of aerial images of a site with a plurality of known ground control points, the first plurality of aerial images showing the plurality of known ground control points;
build an initial three-dimensional representation from the first plurality of aerial images showing the plurality of known ground control points, wherein the initial three-dimensional representation comprises data points;
generate a transformation based on the initial three-dimensional representation and the plurality of known ground control points;
access at least one new aerial image of the site without the plurality of known ground control points, wherein the plurality of known ground control points are not shown within the at least one new aerial image;
build a new unreferenced three-dimensional representation based, at least in part, on the at least one new aerial image of the site without the plurality of known ground control points; and
apply the transformation generated based on the initial three-dimensional representation and the plurality of known ground control points to the new unreferenced three-dimensional representation built based on the at least one new aerial image showing the site without the plurality of known ground control points to create a new georeferenced three-dimensional representation, wherein the transformation defines rotation, scaling, and translation of the data points in the initial three-dimensional representation to geographic locations of the data points.

18. The non-transitory computer readable medium of claim 17, further comprising instructions that, when executed by the at least one processor, cause the computer system to:
generate a georeferenced orthomap from the new georeferenced three-dimensional representation, wherein the georeferenced orthomap comprises a geometrically corrected aerial image of the site where tilt and relief have been corrected to portray a uniform scale; and
provide the georeferenced orthomap for utilization in at least one of navigating the site, modifying at least a portion of the site, or building a structure on at least a portion of the site.

19. The non-transitory computer readable medium of claim 17, further comprising instructions that, when executed by the at least one processor, cause the computer system to:
generate a plurality of refined ground control points based on observed positions of the plurality of known ground control points in the first plurality of aerial images and measured positions of the plurality of known ground control points; and
apply a constrained bundle adjustment algorithm to the initial three-dimensional representation utilizing the plurality of refined ground control points, wherein the constrained bundle adjustment algorithm weights the plurality of refined ground control points by setting the plurality of refined ground control points as anchors in the constrained bundle adjustment.

20. The non-transitory computer readable medium of claim 19, wherein generating the plurality of refined ground control points further comprises:
filtering the observed positions of the plurality of known ground control points based on the measured positions of the plurality of known ground control points;
generating a transformation based on the filtered observed positions and corresponding measured positions; and
applying the transformation inversely to the measured positions of the plurality of known ground control points to generate refined ground control points.

* * * * *